US007631335B2

(12) United States Patent  
Creamer et al.

(10) Patent No.: US 7,631,335 B2
(45) Date of Patent: Dec. 8, 2009

(54) INTEGRATED INTERNET CAMERA

(75) Inventors: Rob Creamer, Boulder, CO (US);
Walter Knapp, Boulder, CO (US);
Mark Koch, Broomfield, CO (US);
Yoshiyuki Araki, Saitama-ken (JP);
Richard Helton, Boulder, CO (US)

(73) Assignee: Pentax of America, Inc., Montvale, NJ (US)

( * ) Notice: Subject to any disclaimer, the term of this patent is extended or adjusted under 35 U.S.C. 154(b) by 308 days.

(21) Appl. No.: 11/833,293

(22) Filed: Aug. 3, 2007

(65) Prior Publication Data

US 2007/0288974 A1     Dec. 13, 2007

Related U.S. Application Data

(60) Division of application No. 11/239,048, filed on Sep. 30, 2005, now Pat. No. 7,272,845, which is a division of application No. 10/865,904, filed on Jun. 14, 2004, now Pat. No. 7,350,224, which is a continuation of application No. 09/204,289, filed on Dec. 3, 1998, now Pat. No. 6,930,709.

(60) Provisional application No. 60/067,310, filed on Dec. 4, 1997, provisional application No. 60/085,585, filed on May 15, 1998.

(51) Int. Cl.
*H04N 7/173* (2006.01)
*H04N 5/232* (2006.01)
*H04N 5/225* (2006.01)

(52) U.S. Cl. .................. 725/105; 348/211.3; 348/207.1

(58) Field of Classification Search ................ 725/105; 348/211.3, 207.1, 552, 211.1, 211.8, 211.12, 348/231.2, 231.6, 14.01–14.16, 36, 211.6, 348/154, 155, 158; 358/403; 704/203
See application file for complete search history.

(56) References Cited

U.S. PATENT DOCUMENTS 4,531,161 A    7/1985  Murakoshi (Continued)

FOREIGN PATENT DOCUMENTS

JP          3-268583         11/1991

(Continued)

OTHER PUBLICATIONS

English Language Abstract of JP 10-224676.

(Continued)

*Primary Examiner*—John M Villecco
(74) *Attorney, Agent, or Firm*—Greenblum & Bernstein P.L.C.

(57) ABSTRACT

An integrated Internet camera includes, as embedded components contained within the camera body and controlled by a microcontroller, at least a network interface device for connecting to the Internet, a transport control device for packetizing according to Internet protocols, a file transfer device for communicating with a destination user directory on the Internet, and a transmission initiating device for initiating the connection and transfer operations of the file transfer device and transport control device. The network interface device may be a modem, network adapter, or adapter for connection to the Internet. Upon capturing the digital image, the camera initiates a connection to the Internet, connects to the destination user directory, and uploads the digital images. Thereafter, the digital images are available to authorized (or any) user having access to the Internet.

16 Claims, 22 Drawing Sheets

U.S. PATENT DOCUMENTS

| | | |
|---|---|---|
| 4,746,993 A | 5/1988 | Tada |
| 4,853,733 A | 8/1989 | Watanabe et al. |
| 5,032,918 A | 7/1991 | Ota et al. |
| 5,034,804 A | 7/1991 | Sasaki et al. |
| 5,040,068 A | 8/1991 | Parulski et al. |
| 5,062,010 A | 10/1991 | Saito |
| 5,099,262 A | 3/1992 | Tanaka et al. |
| 5,138,459 A | 8/1992 | Roberts et al. |
| 5,146,353 A | 9/1992 | Isoguchi et al. |
| 5,185,667 A | 2/1993 | Zimmermann |
| 5,231,501 A | 7/1993 | Sakai |
| 5,283,644 A | 2/1994 | Maeno |
| 5,283,655 A | 2/1994 | Usami |
| 5,295,077 A | 3/1994 | Fukuoka |
| 5,343,243 A | 8/1994 | Maeda |
| 5,367,332 A | 11/1994 | Kerns et al. |
| 5,402,170 A | 3/1995 | Parulski et al. |
| 5,414,464 A | 5/1995 | Sasaki |
| 5,475,441 A | 12/1995 | Parulski et al. |
| 5,477,264 A | 12/1995 | Sarbadhikari et al. |
| 5,479,206 A | 12/1995 | Ueno et al. |
| 5,486,853 A | 1/1996 | Baxter et al. |
| 5,488,558 A | 1/1996 | Ohki |
| 5,506,617 A | 4/1996 | Parulski et al. |
| 5,528,293 A | 6/1996 | Watanabe et al. |
| 5,535,011 A | 7/1996 | Yamagami et al. |
| 5,541,656 A | 7/1996 | Kare et al. |
| 5,544,315 A | 8/1996 | Lehfeldt et al. |
| 5,550,586 A | 8/1996 | Kudo et al. |
| 5,568,192 A | 10/1996 | Hannah et al. |
| 5,581,299 A | 12/1996 | Raney et al. |
| 5,587,928 A | 12/1996 | Jones et al. |
| 5,606,365 A | 2/1997 | Maurinus et al. |
| 5,612,732 A | 3/1997 | Yuyama et al. |
| 5,631,701 A | 5/1997 | Miyake |
| 5,633,678 A | 5/1997 | Parulski et al. |
| 5,635,983 A | 6/1997 | Ohmori |
| 5,640,204 A | 6/1997 | Tsutsui |
| 5,646,684 A | 7/1997 | Nishizawa et al. |
| 5,724,155 A | 3/1998 | Saito |
| 5,734,425 A | 3/1998 | Takizawa et al. |
| 5,754,227 A | 5/1998 | Fukuoka |
| 5,796,426 A | 8/1998 | Gullichsen et al. |
| 5,806,005 A | 9/1998 | Hull et al. |
| 5,815,205 A | 9/1998 | Hashimoto et al. |
| 5,818,537 A | 10/1998 | Enokida et al. |
| 5,870,135 A | 2/1999 | Glatt et al. |
| 5,887,140 A | 3/1999 | Itsumi et al. |
| 5,911,044 A | 6/1999 | Lo et al. |
| 5,917,542 A | 6/1999 | Moghadam et al. |
| 5,990,941 A | 11/1999 | Jackson et al. |
| 5,991,842 A | 11/1999 | Takayama |
| 6,005,611 A | 12/1999 | Gullichsen et al. |
| 6,006,039 A | 12/1999 | Steinberg et al. |
| 6,014,693 A | 1/2000 | Ito et al. |
| 6,034,716 A | 3/2000 | Whiting et al. |
| 6,038,296 A | 3/2000 | Brunson et al. |
| 6,043,837 A | 3/2000 | Driscoll, Jr. et al. |
| 6,047,264 A | 4/2000 | Fisher et al. |
| 6,061,502 A | 5/2000 | Ho et al. |
| 6,065,062 A | 5/2000 | Periasamy et al. |
| 6,067,571 A | 5/2000 | Igarashi et al. |
| 6,094,221 A | 7/2000 | Anderson |
| 6,104,430 A | 8/2000 | Fukuoka |
| 6,134,606 A | 10/2000 | Anderson et al. |
| 6,147,598 A | 11/2000 | Murphy et al. |
| 6,167,469 A | 12/2000 | Safai et al. |
| 6,188,431 B1 | 2/2001 | Oie |
| 6,195,511 B1 | 2/2001 | Harada |
| 6,199,166 B1 * | 3/2001 | Lanzy et al. .................. 726/5 |
| 6,204,877 B1 | 3/2001 | Kiyokawa |
| 6,208,426 B1 | 3/2001 | Saito et al. |
| 6,223,190 B1 | 4/2001 | Aihara et al. |
| 6,226,449 B1 | 5/2001 | Inoue et al. |
| 6,256,059 B1 | 7/2001 | Fichtner |
| 6,278,481 B1 | 8/2001 | Schmidt |
| 6,300,976 B1 | 10/2001 | Fukuoka |
| 6,331,869 B1 | 12/2001 | Furlan et al. |
| 6,353,848 B1 | 3/2002 | Morris |
| 6,360,362 B1 | 3/2002 | Fichtner et al. |
| 6,374,406 B2 | 4/2002 | Hirata |
| 6,389,464 B1 | 5/2002 | Krishnamurthy et al. |
| 6,407,752 B1 | 6/2002 | Harnett |
| 6,438,587 B2 | 8/2002 | Kitamura |
| 6,441,924 B1 | 8/2002 | Matsui |
| 6,452,629 B1 | 9/2002 | Aizawa et al. |
| 6,525,761 B2 | 2/2003 | Sato et al. |
| 6,539,547 B2 | 3/2003 | Driscoll, Jr. et al. |
| 6,556,241 B1 | 4/2003 | Yoshimura et al. |
| 6,567,121 B1 | 5/2003 | Kuno |
| 6,567,122 B1 | 5/2003 | Anderson et al. |
| 6,571,271 B1 | 5/2003 | Savitzky et al. |
| 6,583,813 B1 | 6/2003 | Enright et al. |
| 6,591,279 B1 | 7/2003 | Emens et al. |
| 6,594,032 B1 | 7/2003 | Hiroki et al. |
| 6,603,502 B2 | 8/2003 | Martin et al. |
| 6,624,846 B1 | 9/2003 | Lassiter |
| 6,636,259 B1 | 10/2003 | Anderson et al. |
| 6,654,060 B1 | 11/2003 | Kurosawa et al. |
| 6,677,989 B1 | 1/2004 | Aizawa et al. |
| 6,720,987 B2 | 4/2004 | Koyanagi et al. |
| 6,747,692 B2 | 6/2004 | Patel et al. |
| 6,751,297 B2 | 6/2004 | Nelkenbaum |
| 6,965,398 B2 | 11/2005 | Arakt |
| 6,980,232 B2 | 12/2005 | Suzuki |
| 2001/0017655 A1 | 8/2001 | Arakt |
| 2001/0017656 A1 | 8/2001 | Araki |
| 2001/0024232 A1 | 9/2001 | Suzuki |
| 2002/0053087 A1 | 5/2002 | Negishi et al. |
| 2003/0025803 A1 | 2/2003 | Nakamura et al. |
| 2003/0208567 A1 | 11/2003 | Gross |
| 2004/0012811 A1 | 1/2004 | Nakayama |
| 2005/0078189 A1 | 4/2005 | Creamer et al. |
| 2005/0099519 A1 | 5/2005 | Creamer et al. |
| 2005/0144653 A1 | 6/2005 | Creamer et al. |
| 2005/0146609 A1 | 7/2005 | Creamer et al. |
| 2005/0146610 A1 | 7/2005 | Creamer et al. |
| 2005/0149979 A1 | 7/2005 | Creamer et al. |
| 2006/0031902 A1 | 2/2006 | Creamer et al. |

FOREIGN PATENT DOCUMENTS

| | | |
|---|---|---|
| JP | 4-980 | 1/1992 |
| JP | 5-166090 | 7/1993 |
| JP | 5-167979 | 7/1993 |
| JP | 8-102837 | 4/1996 |
| JP | 5-153453 | 6/1996 |
| JP | 8-171691 | 7/1996 |
| JP | 8-315106 | 11/1996 |
| JP | 8-317268 | 11/1996 |
| JP | 9-288684 | 11/1997 |
| JP | 9-307794 | 11/1997 |
| JP | 10-224676 | 8/1998 |
| JP | 10-243153 | 9/1998 |
| JP | 10-320685 | 12/1998 |
| JP | 11-27567 | 1/1999 |
| JP | 11-27650 | 1/1999 |
| JP | 11-341338 | 12/1999 |
| JP | 3034243 | 2/2000 |
| WO | 91/07850 | 5/1991 |
| WO | 96/02106 | 1/1996 |
| WO | 99/48276 | 9/1999 |

WO 00/07341 2/2000

OTHER PUBLICATIONS

English Language Abstract of JP 10-320685.
English Language Abstract of JP 8-315106.
English Language Abstract of JP 11-27650.
"Apple's New Image-Capture Platform", *Apple Directions*, Aug. 1996, pp. 1, 15, 17-21.
"Digita Camera Operating System", The Kleper Report on Digital Publishing, Issue 3.6, Nov./Dec. 1998.
"FlashPoint shows how to process digital photos without a PC", EE Times, posted Apr. 16, 1998.
"Internet Yearbook '96, vol. 1", Sections 2, 4, pp. 28-33, 208-229, Gijyuto Hyouroun Inc., Apr. 5, 1996.
"Intranet TCP/IP Bible", Chapter 5, "TCP and UDP", pp. 62-99, Nobukazu Iguchi, Ohm, Inc., May 30, 1997.
"Connectionless Transport: UDP", Ross and Kurose; http:// etc. 1996-2000.
A facsimile press release, PR Newswire file No. p1210083.106, transmitted Dec. 10, 1996, relating to an "Axis NetEye 200".
A printout (labeled W-1) of a World Wide Web site (Web site) relating to an "Hitachi MPEGCAM", 5 pages, printed Jul. 8, 1997.
A printout (labeled W-2) of a Web site relating to a "Microplex NetWorkEye", 2 pages, printed Aug. 14, 1997.
A printout (labeled W-3) of a Web site relating to a "StarDot WinCam", 3 pages, printed Aug. 5, 1997.
A printout (labeled W-4) of a Web site relating to an "MRT Observer", 1 page, printed Aug. 14, 1997.
A printout (labeled W-5) of a Web site relating to a "Carecams RCS5000", 1 page, printed Aug. 14, 1997.
A printout (labeled W-6A) of a Web site relating to an "EarthCam Internet Camera", 2 pages, printed Aug. 14, 1997.
A printout (labeled W-6B) of a Web site relating to the "EarthCam Internet Camera", 10 pages, printed Oct. 3, 1997.
A printout (labeled W-7) of a Web site relating to an "Axis NetEye", 1 page, printed Aug. 14, 1997.
A printout of a News Release from NEC dated Feb. 13, 1997, relating to Picona digital camera.
A printout of a Press Release from Apple dated Feb. 17, 1997, relating to QuickTake 200 digital camera.
A printout of a Press Release from Apple dated May 13, 1996, relating to QuickTime image capture system.
A printout of a Press Release from FlashPoint dated Dec. 8, 1997, relating to Digita operating system.
A printout of a Press Release from FlashPoint dated Jun. 15, 1998, relating to Kodak DC220 and DC 260 cameras with Digita operating system.
A printout of Apple Service Source Manual for QuickTake 200 digital camera.
English language translation of NEC Picona digital camera, Instruction Manual for PC-DC200 and PC-DC200K, dated Feb. 1997.
NEC Picona digital camera, Instruction Manual for PC-DC200 and PC-DC200K, dated Feb. 1997.
Printout of a Web site relating to Samsung "Webthru" cameras, printed on Aug. 14, 2001.
Ricoh DC-1 brochure, May 1995, along with a partial English language Translation.
Ricoh Digital Electronic Still (Video) Camera, Instruction Manual for Using DC-1, 1995, along with a partial English language translation.
Samsung Webthru SWC 101/104 User's Guide, printed from Webthru web site on Aug. 14, 2001.
Samsung Webthru SWC 160 User's Guide, printed from Webthru web site on Aug. 14, 2001.
P.M. Corcoran et al., "Internet Enabled Digital Photography," IEEE, pp. 84-84.
Various "Sharp Zaurus MI-506" materials, pp. 18-19, 22-27, 182-193, 234-235; 1-5, 82-83; 1-7, 74-75, 124-125, 128-129; 1/11-11/11, product introduced Jul. 17, 1997, with full English language translation.
A printout (labeled W-8) of a Web site relating to "Omniview: Electronic Aim and Zoom Camera," printed on Feb. 6, 2001.
A printout (labeled W-9) of a Web site relating to "Interactive Pictures Presents the Whole Picture," printed on Feb. 6, 2001.
English Language Abstract of JP 8-102837.
English Language Abstract of JP 8-171691.
A printout (labeled W-10A) of a Web site relating to "Omniview Motionless Camera Orientation System", printed on Feb. 6, 2001.
A printout (labeled W-10B) of a Web site relating to "Stationary Camera Aims and Zooms Electronically", printed on Feb. 6, 2001.
English Language Abstract of JP 11-341338.
Axis 200+ Quick Installation Guide, Revision 1.0, having an indicated date thereon of Feb. 1998, which was downloaded/printed in 2006.
Axis 200+ Web Camera Product Page, downloaded/printed in Sep. 2006, which indicates that a User Manual for the Axis 200+ was updated on Jan. 30, 1998.
User Report, with an English language translation, Aug. 1998.
Axis NetEye literature obtained from the website http://www.axis.com, including Axis NetEye 200 Datasheet, Features and Benefits, Technical Overview, Alternative Solutions; A NetEye's View, and a Live NetEye Snapshot, downloaded/printed in Dec. 1996.
*Smile, You're on the Web*, Pipeline, PC Magazine, having an indicated date thereon of Dec. 3, 1996, at 9.
*I Spy with my little NetEye*, PCWeek NetWeek, Nov. 4, 1996, at N1, N15.
Axis 200 Quick Installation Guide, Revision 1.5, having an indicated date thereon of Oct. 1997, which was downloaded/printed in Jul. 2006.
A Dialog printout of *WebSheet*, Manufacturing Systems, vol. 15, No. 7, having an indicated date thereon of Jul. 1997, at 14.
A Dialog printout of Stephen Pritchard, *How to Get Your Camera Rolling*, Independent (London), 3d. Ed, having an indicated date thereon of Feb. 3, 1997 at 11.

\* cited by examiner

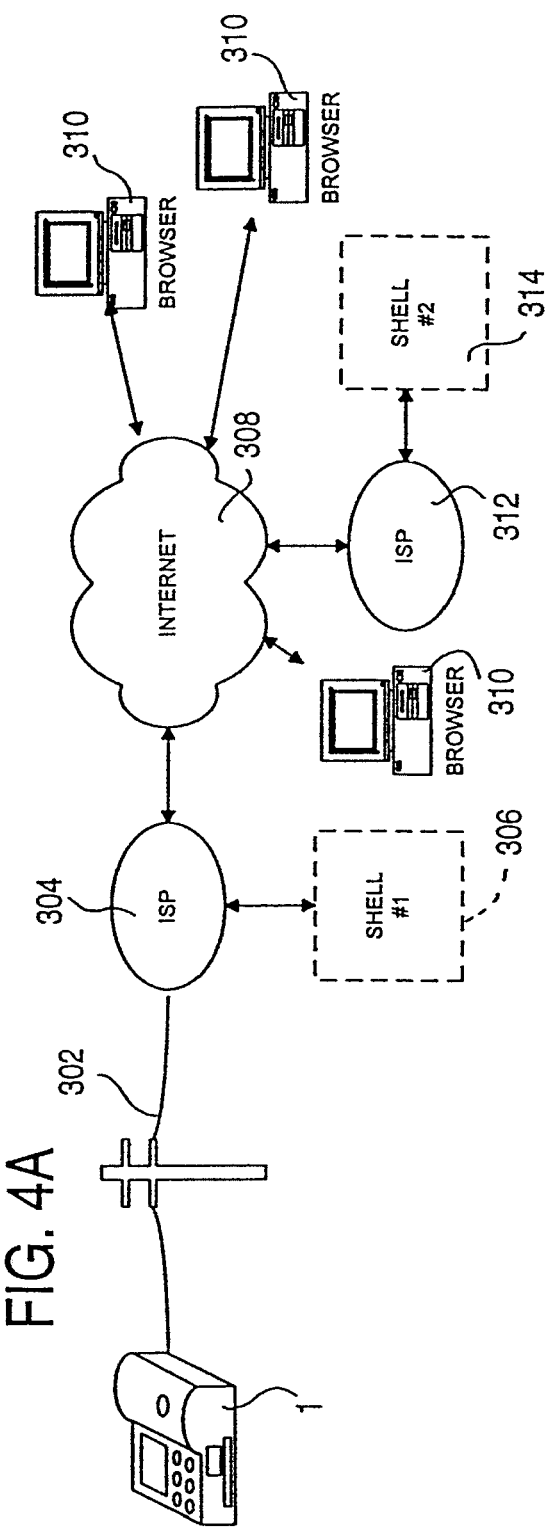
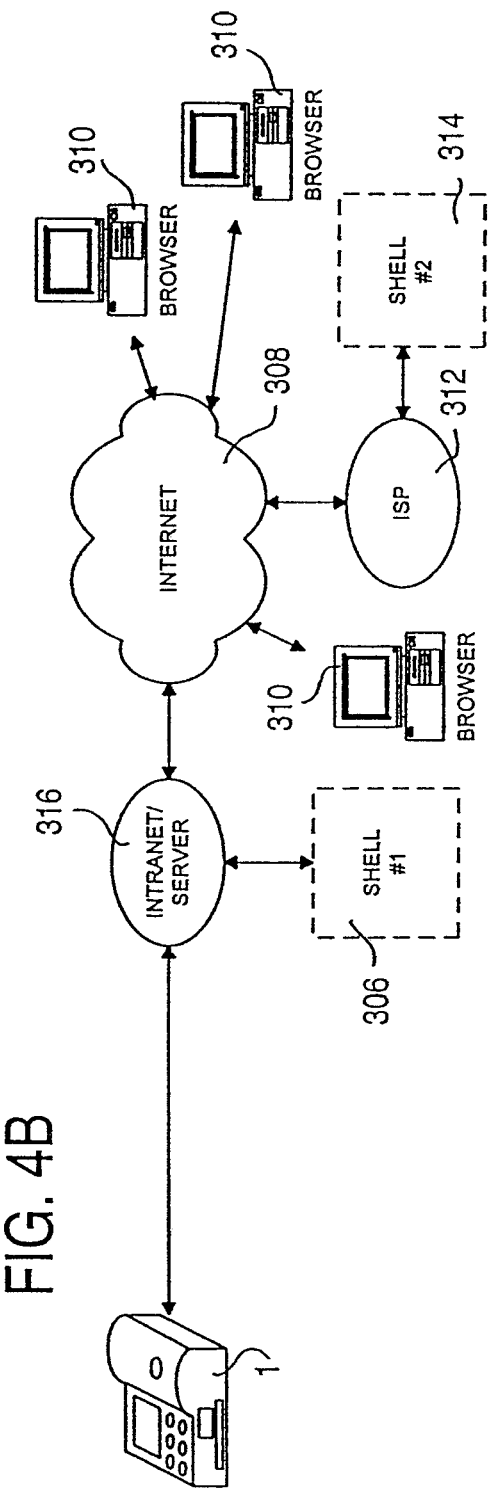
FIG. 4A
FIG. 4B

INTEGRATED INTERNET CAMERA

The present application is a divisional of copending U.S. patent application Ser. No. 11/239,048, filed Sep. 30, 2005, which is a divisional of U.S. patent application Ser. No. 10/865,904, filed Jun. 14, 2004, which is a continuation of U.S. patent application Ser. No. 09/204,289 (now U.S. Pat. No. 6,930,709), filed Dec. 3, 1998; and claims the benefit of U.S. Provisional Application 60/067,310, filed Dec. 4, 1997, and U.S. Provisional Application 60/085,585, filed May 15, 1998; all of which are expressly incorporated herein by reference in their entireties.

BACKGROUND OF THE INVENTION

1. Field of the Invention

The present invention relates to an integrated camera for connecting to the Internet and transmitting images over the Internet.

2. Description of Background Information

As the Internet (i.e., the worldwide inter-network, currently operated under TCP/IP: Transmission Control Protocol/Internet Protocol) gains more participants and becomes more consumer-oriented, the demand for simplified ways of providing access to various media increases. A large portion of the new participants seek access to the "World Wide Web" (i.e., a hypertext-driven global multimedia system, hereinafter the "Web"). Archives of digital images (photographs and motion video) are now ubiquitous. The demand for real-time or live video, whether motion video or still video, has different requirements, but has also become strong. Needs in entertainment, advertising, education, security, traffic monitoring, weather monitoring, child care monitoring, and surveillance, as well as general consumer usage, have driven the creation of an initial wave of systems able to place a real-time image, or series of images, on the Internet and on the Web.

However, the prior systems are complex and expensive, requiring the use of a general purpose personal computer and a host of peripheral devices to place an image on the Internet or Web, as well as attendance by a qualified operator. The systems are typically large and lack portability.

An example of such a prior system is shown in FIG. 1. A video camera 110 connects to a "frame grabber" peripheral card 112, hosted by the parallel bus 114 of a personal computer 122. The frame grabber card 112 decodes a frame of an analog video signal from the video camera 110 into a digital image, and makes the digital image available to purpose-designed software running on the computer 122. Typically, the purpose-designed software eventually compresses the digital image into main memory using the main microprocessor of the personal computer 122. In order to upload the image to the Internet, the computer 122 requires a serial port 118 and attached modem 120, which are hooked to the public telephone system 124. The personal computer 122 uses further software programs running in main memory, which include at least a modem driver, network transmission protocol (e.g., TCP/IP) driver, a telephone transmission protocol (e.g., PPP: Point-to-Point Protocol) driver, and an file transfer protocol (e.g., FTP: File Transfer Protocol) application, to connect to the modem 120, through the telephone system 124, and to an ISP (Internet Service Provider) 128. Thereafter, the personal computer 122 may upload the compressed image to a shell account available at the ISP 128.

Costs for such a system may run to several thousand dollars. The computer 122 must be on-site, i.e., relatively close to the camera 110, and is large and relatively immobile. Since the system is an assembly of general-purpose components, and the computer 122 is usually dedicated to serving the camera 110, the system has numerous redundant functions and excess capabilities. In particular, multiple microprocessors/controllers, power supplies, and communication lines are necessary to operate the separate parts of the system. Moreover, such systems include many opportunities for error because of the many interfaces and communication links between discrete devices. Such error may occur as difficulties in setup and configuration and incompatibility between devices in operation.

3. Acronyms

The following acronyms and abbreviations are used throughout the specification. For brevity, the definitions are summarized as follows:

xDSL—(generic) Digital Subscriber Line
ATM—Asynchronous Transfer Mode
CCD—Charge Coupled Device
CCTV—Closed Circuit Television
DNS—Domain Naming System, Domain Name Server
ExCA—Exchangeable Card Architecture
FTP—File Transfer Protocol
HTML—Hypertext Markup Language
IrDA—Infrared Data Association
ISA—Industry Standard Architecture
ISDN—Integrated Services Digital Network
ISP—Internet Service Provider
JPEG—Joint Photographic Experts Group
MIME—Multipurpose Internet Mail Extension
NTSC—National Television System Committee
PAL—Phase Alternating Line
PCMCIA—Personal Computer Memory Card International Association
POTS—Plain Old Telephone Service
PPP—Point-to-Point Protocol
SLIP—Serial Link Interface Protocol
SMTP—Simple Mail Transfer Protocol
TCP/IP—Transmission Control Protocol/Internet Protocol
UDP/IP—User Datagram Protocol/Internet Protocol
URL—Uniform Resource Locator
USB—Universal Serial Bus

SUMMARY OF THE INVENTION

Accordingly, it is an object of the invention to provide an inexpensive and efficient camera having all necessary functionality for transmission of real-time and stored digital images to the Internet in a single, portable standalone apparatus (i.e., an embedded system), without requiring the use of an external controlling apparatus such as a personal computer.

It is a further object of the invention to provide a portable, standalone camera that may initiate and independently control scheduled transmission of digital images to the Internet, where the images become available to any authorized user on the Internet. The above objects are attained by providing an integrated Internet camera for transmitting digital images to an Internet address, including an image pickup, an optical system for forming an image on the image pickup, and an image capturing circuit for capturing digital images from the image pickup. A network interface device connects to the Internet for transmission of the digital image files to the Internet, and a file transfer device communicates via the network interface device, with a destination shell account at a predetermined Internet address and transfers the digital image files to the destination shell account according to a predetermined file transfer protocol. The digital image files in the destination shell account are then available to users accessing the Internet. A transport control device packetizes the digital image files according to a predetermined Internet transport control protocol, and controls addressing of the packetized digital image files to the predetermined Internet address, while a transmission initiating device initiates a connection with the Internet via the transport control device and the network interface device. A first scheduling device, including timers, schedules transfer of the digital image files to the destination shell account by the transport control device and the file transfer device. A microcontroller controls operations and communication between each of the recited devices, and a camera body houses therein all of the recited devices and the microcontroller.

In another aspect of the invention, an Internet camera system for transmitting digital images via the Internet includes a destination shell account having a user directory at a predetermined Internet address and an accessing device for accessing the user directory of the destination shell account via the Internet. As part of the system, an integrated Internet camera is housed in a camera body. The camera body contains an image capturing system, a network interface device, a file transfer device, a transport control device, and a transmission initiating device. The image capturing system captures digital images, and the network interface device is connectible to the Internet for transmission of the digital image files to the Internet. The file transfer device communicates, via the network interface device, with the destination shell account and transfers the digital image files to the user directory of the destination shell account according to a predetermined file transfer protocol. The digital image files in the user directory of the destination shell account are then available to the accessing device accessing the Internet. A transport control device packetizes the digital image files according to a predetermined Internet transport control protocol, and controls addressing of the packetized digital image files to the predetermined Internet address. The transmission initiating device initiates a connection with the Internet via the transport control device and the network interface device.

In this manner, the portable, standalone integrated Internet camera may initiate and independently control scheduled connections to the Internet and transmission of real-time digital images to the Internet, without requiring the use of an external controlling apparatus such as a personal computer or server, and the images become available to any authorized user on the Internet. As part of a system, the portable, standalone integrated Internet camera may initiate and independently control scheduled connections to a destination shell account having a user directory at a predetermined Internet address and transmission of real-time digital images to the user directory, without requiring the use of an external controlling apparatus such as a personal computer or server, and the images become available to any authorized user on the Internet via the accessing device.

The network interface device may include a modem for connecting to a telephone system connected to the Internet. In this case, the transmission initiating device includes a telephone conversion device that initiates a telephone connection with the Internet via the modem according to a predetermined telephone transmission protocol, and that converts between the predetermined telephone transmission protocol and the predetermined Internet transport control protocol. Accordingly, the integrated Internet camera may perform the recited functions over a public or private telephone network, or any network or connection using telephone transmission protocols or analog data transmission.

The integrated Internet camera may include a second scheduling device, including timers, for scheduling image captures by the image capturing circuit. Accordingly, image captures and image transmission may be scheduled at different times. In this case, the digital image files may include information representing a status of one or more timers.

The integrated Internet camera may further include a character generator for generating textual information in the captured digital images, wherein the character generator generates textual information in the captured digital images. In this case, the generated textual information may represent a status of one or more timers.

The integrated Internet camera may include a serial interface adapted to connect to a setup device, the serial interface receiving commands for controlling the integrated Internet camera from the connected setup device. In this manner, the integrated Internet camera may by controlled or configured by another device.

Optionally, one or more of the transport control device and file transfer device further includes a network authentication device for providing network login authentication for connecting to the predetermined Internet address via the network interface device. In this manner, the integrated Internet camera may access and transmit files to networks having security and authorization provisions.

The integrated Internet camera may further include a configuration device, which includes a configuration information retrieving device and a configuration setting device. The configuration information retrieving device retrieves configuration information from the destination shell account, while the configuration setting device sets operational parameters of one or more of the image capturing circuit, the network interface device, the file transfer device, transport control device, the transmission initiating device, and the first scheduling device, according to the configuration information.

Further, the file transfer device may further include a directory selecting device for setting and transmitting a destination directory and filename for transferring digital image files to the destination shell account, allowing the transmission of digital image files to one or more specific directories of a destination shell account.

The image pickup may include a color component system for forming a color image, in which case the integrated Internet camera may further include a color adjusting circuit for adjusting color properties of the captured digital images.

The integrated Internet camera may include an image compression circuit that generates compressed digital image files from the captured digital images, so that the file transfer device transfers the compressed digital image files to the destination shell account and the transport control device packetizes the compressed digital image files according to the predetermined Internet transport control protocol.

In one modification of the system, the predetermined Internet transport control protocol does not detect errors or retransmit erroneous data, thereby increasing a rate of image transfer by the file transfer device.

In another modification the integrated Internet camera further includes an E-mail transmission device and E-mail message assembler. The E-mail message assembler assembles E-mail messages representing a status of the camera and the E-mail transmission device transmits the E-mail messages to a predetermined E-mail address via the transport control device and the transmission initiating device.

In this case, the E-mail message assembler may assemble E-mail messages including the digital image files. Accordingly, the E-mail transmission device may transmits the E-mail message including the digital image files to a predetermined E-mail address via the transport control device and the transmission initiating device.

The integrated Internet camera may further include a trigger device linked to the camera and/or the microcontroller. In response to triggering of the trigger device, the camera initiates an image capture and transfer of the digital image files to the destination shell account via the file transfer device, the transport control device, and the transmission initiating device.

Optionally, the integrated Internet camera further includes a video input for receiving a standard video signal, and the image capturing circuit captures the digital images from the video input instead of from the image pickup. In this manner, a camcorder or other video source (tuner, CCTV network) may be used to supply the digital images to be transmitted over the Internet or otherwise.

In another modification, the integrated Internet camera further includes a video output for sending a standard video signal, wherein the digital image files are transmitted as video images to the video output. In this manner, any images transmitted over the Internet or otherwise may also be supplied to, e.g., a local monitor, recording device, or CCTV network.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein:

FIGS. 4A and 4B are schematic diagrams of the integrated Internet camera of FIG. 2 connected to the Internet;

DESCRIPTION OF THE PREFERRED EMBODIMENTS

Figure 1:
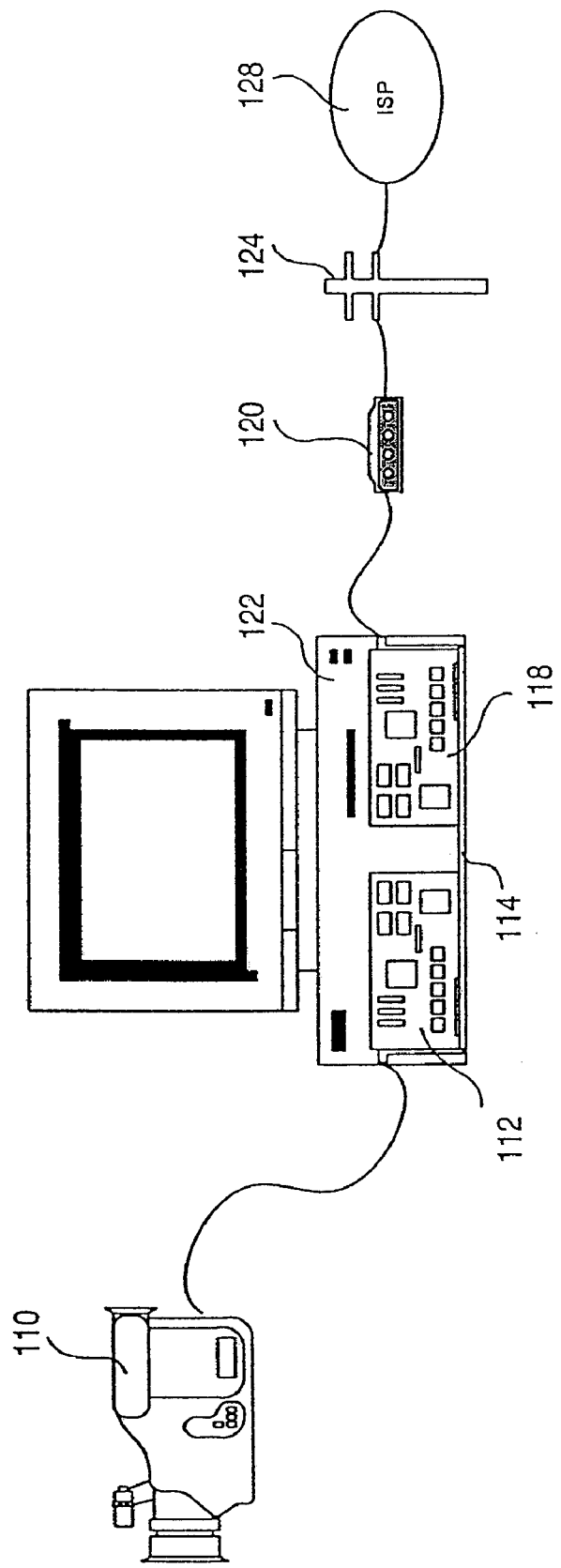
FIG. 1 is a block diagram of a prior art system capable of transmitting digital images to the Internet.
Figure 2:
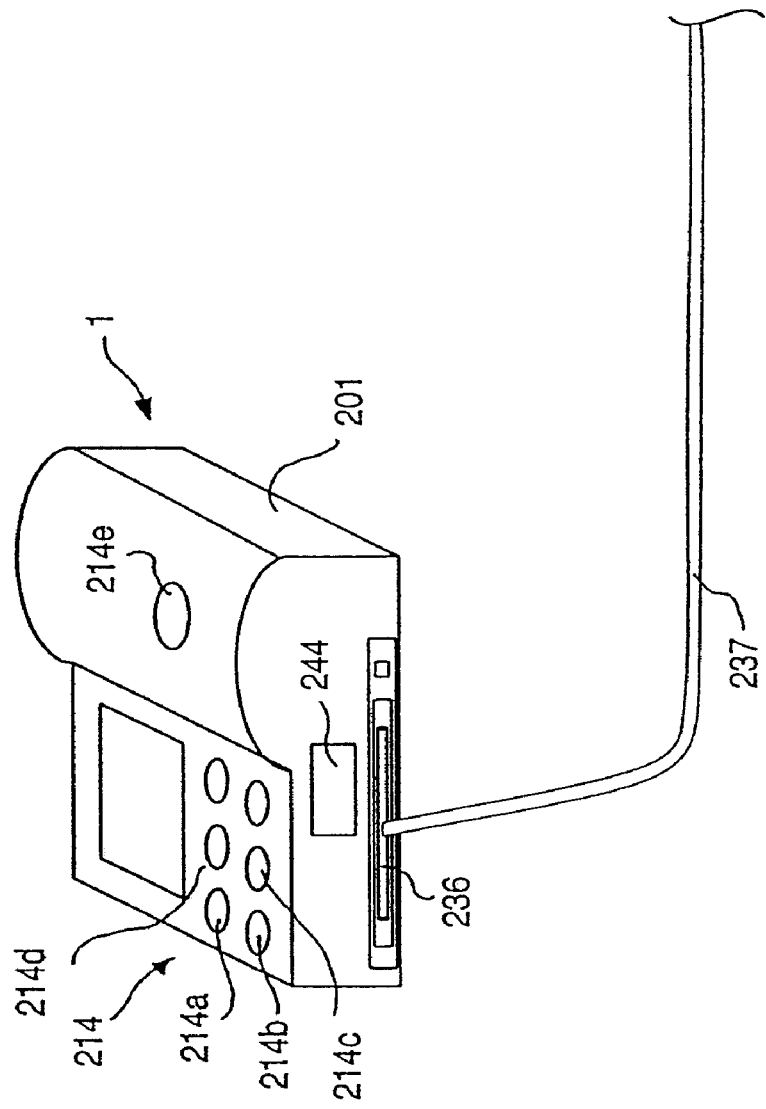
FIG. 2 is a perspective view of an integrated Internet camera according to a first embodiment of the invention.

FIG. 2 shows a first embodiment of the present invention. All of the electronic, mechanical and optical components of the integrated Internet camera 1 are housed within a camera body 201. Accordingly, in the context of this specification, "integrated" is equivalent to "self-contained", such that all the noted components are supported on or situated within the body or casing. As shown in FIG. 2, the camera 1 may be connected to the Internet via a network interface device 236 (comprising, e.g., a modem or network card) and a connection cable 237 (which may be a telephone wire connected to the public network or a network cable connected to a local or wide area network). Preferably, the camera body includes a threaded camera mount, and is sized and shaped to fit industry standard environmental housings for outdoor use.

Figure 3:
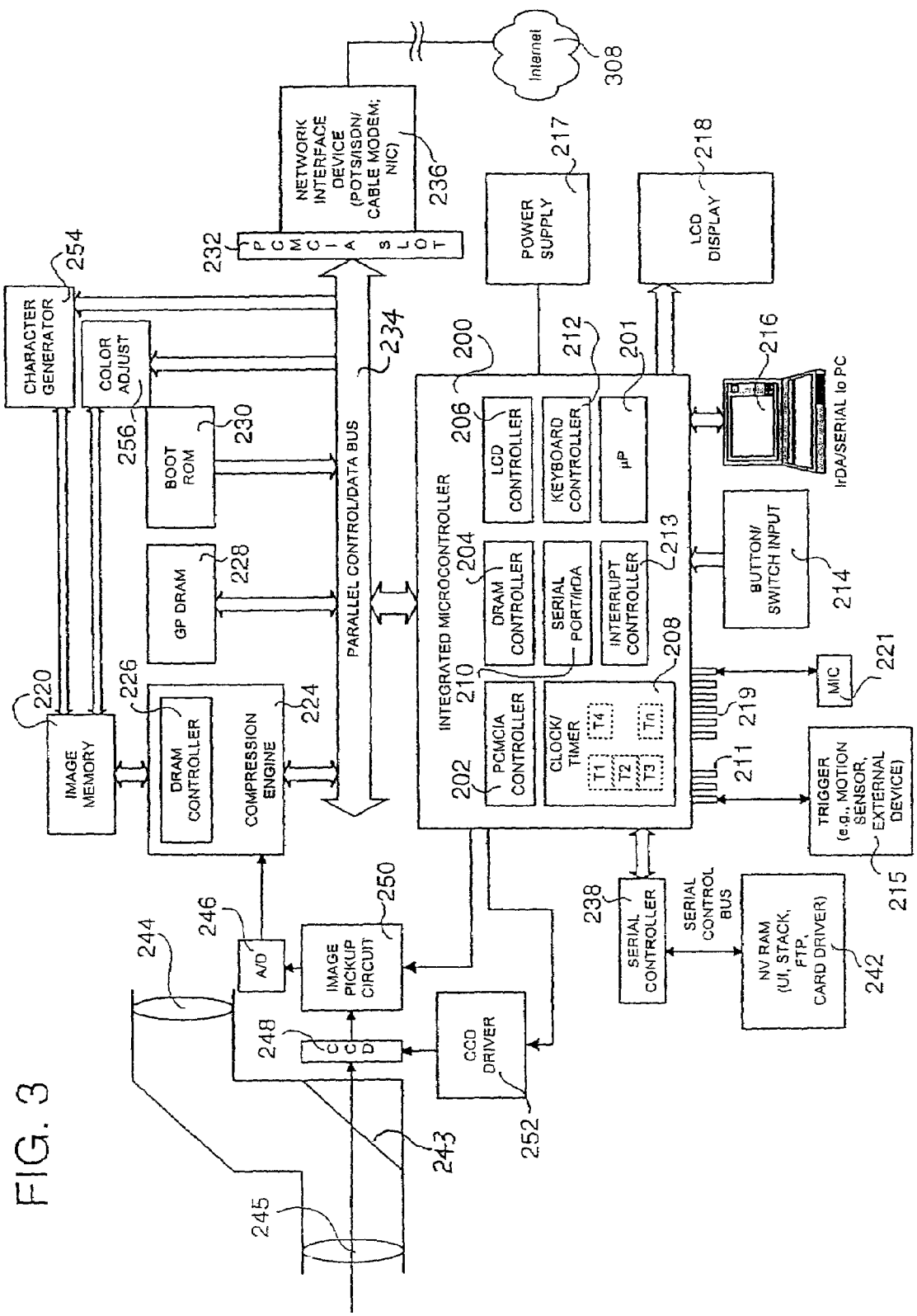
FIG. 3 is a block diagram of the integrated Internet camera shown in FIG. 2.

A viewfinder 244 allows the operator to view a scene corresponding to, or identical to, an image formed on an image pickup (shown in FIG. 3) of the camera 1 via an image-forming optical system (shown in FIG. 3). A display (e.g., an LCD) 218, preferably an inexpensive multi-line text display, displays the results of user interaction, automatic reporting, and status reporting to the user. The user may input appropriate directions to the camera 1 via at least a button/switch input 214. In the first embodiment, the button/switch input 214 preferably includes up and down buttons 214a and 214b, a "menu" button 214d for switching between and activating interaction menus, an "item" button 214c for indicating a selection in an active interaction menu, and a release button 214e for initiating the capture of an image in an event-based mode (including manual operation) and other specific functions (described later).

FIG. 3 is a block diagram of the first embodiment of the integrated Internet camera 1. The camera 1 is preferably operated in an "always-on" state, i.e., although it may appear to an operator that the camera is unpowered when the camera is "turned off" by, e.g., an "on-off" switch, the camera 1 remains responsive to control signals and inputs even when "turned off". As shown in FIG. 3, the camera 1 is preferably controlled by an integrated microcontroller 200, which includes: a main processor or microprocessor 201; a parallel (e.g., 16 bit ISA) bus 234 (which connects to components outside the microcontroller 200); a slot controller 202 (e.g., a PCMCIA slot controller) for controlling a slot interface 232 (e.g., a PCMCIA interface) on the parallel bus 234, a memory (DRAM) controller 204 for controlling a general purpose (GP) memory (DRAM) 228 on the parallel bus 234, a display (e.g., LCD) controller 206 for controlling display functions of the display 218 connected thereto, a real-time clock (clock/timer) 208 against which timing and interval functions are measured, a serial/IrDA port 210 (e.g., serial interface) for connecting an external peripheral or computer (as a setup device or otherwise) with the microcontroller 200, interrupt controllers 213, and a keyboard controller 212 for scanning the button/switch input 214.

The microcontroller 200 also integrates a plurality of general-purpose input/outputs 219 (GPIO pins) and trigger inputs 211, each communicating with the main processor 201. As shown in FIG. 3, the GPIO pins 219 may be connected to various inputs and outputs, for example, an audio input 221 (MIC). Furthermore, the trigger inputs 211 may be connected to external triggering devices 215 (e.g., motion sensors or trip switches) which send an event signal—a "manual" release signal—to the microcontroller 200 (as described below). It should be noted that the GPIO pins 219, since they may receive input signals, are capable of acting in the same manner as the trigger inputs 211. One integrated microcontroller suitable for use in the camera 1 is the Vadem VG330, an x86 compatible single-chip microcontroller having the above-described components, available from Vadem, Inc., 1960 Zanker Rd., San Jose, Calif. The Vadem microcontroller may run under an operating system incorporating the transport control protocol (e.g., TCP/IP) stack discussed herewithin. It should be noted that a microcontroller having a lower level of integration may be utilized, with any of the above-noted integrated components provided off-chip. One suitable microcontroller with a lower level of integration is the H8/3437 (available from Hitachi Semiconductor (America), Inc., 6431 Longhorn Dr., Irving, Tex., 75063), used, for example, in combination with a Fuji MD8501 PCMCIA controller (with direct memory access), available from Fujifilm Microdevices Co., Ltd., 1-6, Matsusakadaira, Taiwacho, Kurokawa-gun, Miyashi, Japan 981.

The slot (PCMCIA) controller 202 and interface 232, in combination, may be configured to handle at least PCMCIA 2.1 and ExCA standard cards, supporting a network interface device 236, as described below, as well as hot swapping and memory cards.

As noted, the display 218 is an inexpensive multi-line display capable of displaying character or text information, and of responding to the control of the display controller 206. The real-time clock 208 has both clock and timer functions, maintaining the current date and time, as well as responding to queries by returning the date and/or time, starting and stopping one or more interval timers, or returning the status of a given timer. The real time clock 208 may be set or reset automatically or manually. If the user so desires, the camera 1 may connect to a server (e.g., via user port 13 of TCP/IP) to retrieve the current date/time string, or alternatively to port 37 to retreive the number of seconds since midnight, Jan. 1, 1900, coordinated universal time). Based upon these values and upon a time zone setting in the variable groups, the current time may be automatically set.

The serial/IrDA port 210 is provided with one or both of an infrared transceiver operating under the IrDA standard, or a serial interface (e.g., an RS-232C interface with a DB9 connector). The serial/IrDA port 210 is connectible to a portable computer 216 or setup device via cable or infrared transceiver. The interrupt controllers 213 process interrupts from, e.g., the keyboard controller 212, memory controller 204, slot controller 202, serial/IrDA port 210, GPIO pins 219, trigger inputs 211, or the parallel bus 234.

The parallel bus 234 connects to: the microcontroller 200 for transferring control instructions and data; to a compression engine 224 for compressing captured images (further connected to an image memory 220); the general purpose (GP) memory (DRAM) 228 used by the microcontroller 200 as storage and application space; a boot ROM 230 for booting the microcontroller 200 (i.e., self-test and O/S retrieval); a color adjusting circuit 256 for performing image processing on a stored digital image; a character generator 254 for superimposing text information on a stored digital image; and the slot interface 232. The GP memory 228 is preferably at least 2 MB, and the image memory is preferably at least 512K.

The compression engine 224 implements image compression in hardware, freeing the main processor 201 to perform other tasks. Preferably, the compression engine 224 performs image compression under a JPEG standard, but may be alternatively arranged to output other image formats (e.g., TIFF, GIF) and/or other compression schemes (e.g., Huffman, wavelet, fractal). When JPEG is used as the standard, the compression engine 224 is able to encode, decode, and recode JPEG image files with any suitable JPEG compression level at 8-bit greyscale or 24-bit color (8 bit*3 color planes). Preferably, the compression engine 224 handles variable compression levels on a continuous basis, e.g., 0-100%, but also may be set, for simpler operation, to compress in at least four JPEG compression levels include low, medium, high, and maximum image quality levels.

The color adjusting circuit 256 is preferably a dedicated circuit for performing image data manipulation of an image stored in the image memory 220. The color adjusting circuit preferably includes: a color adjusting (gamma) module for performing a color correction on the stored image, e.g., to compensate for the color spectral characteristics (linearity) of the image pickup (CCD); a brightness module for increasing or decreasing the overall brightness of the stored image; a contrast module for increasing or decreasing the overall contrast to the stored image; a scaling module for interpolating or resampling the stored image to increase or decrease the size of the stored image, including adjustment of an aspect ratio of the image and cropping of any portion of the image; a hue/saturation/luminance module for increasing or decreasing hue, saturation, and luminance of the stored image. Each of these modules may use a conventional algorithm to perform the desired correction or function.

Although the color adjusting calculations are performed by the color adjusting circuit 256, the color adjusting calculations may alternatively be performed by the compression engine 224, or by the microcontroller 200 in combination with appropriate color adjusting applications, e.g., loadable from the NVRAM 242 into the GP memory 228.

The character generator 254, upon receiving a character string (e.g., a date and/or time and/or annotation string), generates bitmap characters according to an internally stored font, and changes values of memory positions in the image memory 220 (corresponding to colors of image coordinates within a stored image) to superimpose the text information on a stored digital image. The character generator may be set to invert all the pixels corresponding to the bitmap character in the stored image (to ensure the characters are visible), or to change all the pixels corresponding to the bitmap characters in the stored image to the same value (providing characters of a uniform color).

The microcontroller 200 is further connected to a serial controller 238 (e.g., an EEPROM controller) having a serial bus. A rewritable non-volatile memory (NVRAM) 242 (e.g., an EEPROM), preferably at least 64K, is provided on the serial bus. The NVRAM stores system firmware, parameters, and applications for the camera 242, and is accessed by the microcontroller 200 at least according to the boot ROM 230, e.g., when the microcontroller 200 is initialized. Alternatively, the NVRAM 242 is a persistent flash memory, which may be rewritten with a flash memory controller that replaces the EEPROM controller discussed above. Preferably, the NVRAM 242 stores at least: a user interface/operating system application for controlling the microcontroller 200; an exposure control application with automatic gain control (AGC) for controlling an exposure taken by an image pickup circuit 250; a transport control protocol stack for Internet access (e.g., a TCP/IP stack); a file transfer application (e.g., FTP application); and at least one driver (e.g., modem driver, network adapter driver) for the network interface device 236 connected to the slot interface 232. One example of a suitable NVRAM 242 is a serial EEPROM of the NM24cxx series, available from National Semiconductor, Inc., 2900 Semiconductor Dr., Santa Clara, Calif., 95051. Further alternatively, the NVRAM 242 only stores parameters as described, while, e.g., the remaining software/firmware is stored in and executed from a separate ROM, which may also be a flash memory (that can be updated with new software/firmware).

The transport control protocol stack, as controlled by the microcontroller 200, packetizes all data transmitted under the transport control protocol (e.g., TCP/IP) connection, and inserts header information (including addressing information) into each packet. Accordingly, when the camera 1 is connected to the Internet via the network interface device 236 under the transport control protocol, all transmissions, including those of image files, are packetized and addressed according to the transport control protocol.

As previously discussed, one example of a standard protocol which may be provided in the transport control protocol stack is TCP/IP, a connection-oriented protocol that offers error reporting, prioritizing of data, and retransmission of lost or erroneous packets. In this model, the TCP layer accepts and segments data streams and passes the segments to the IP layer for routing, accepts segmented data from the IP layer, resolves error conditions, and resequences segments as necessary. The IP layer routes segmented data, resolves error conditions, and presents data to the TCP layer for resequencing. This kind of protocol is more useful for reliable transmission of data that must be correct, e.g., transmission of specific still images, or for retrieval or reception of a configuration file (described below).

Alternatively or in addition, a low-overhead protocol that provides no retransmission or error correction features may be used, e.g., packets containing image data or other data that fail an error check, e.g., a checksum or CRC (cyclic redundancy check), are discarded, and are not retransmitted. One candidate protocol is UDP/IP, which may be provided as part of the transport control protocol stack instead of or in addition to the protocol responsive to transmission errors (e.g., TCP/IP). This kind of protocol significantly reduces the overhead (e.g, a packet header contains less data) of the error-responsive protocols, and is useful for streaming images at the fastest possible rate. Accordingly, as described below, when the camera is set to stream images at the fastest possible rate, the camera may switch to a lower-overhead protocol (e.g., UDP/IP) provided as part of the transport control protocol stack. Present models allow for a streaming transmission of still images of approximately 15 frames per minute under a low-overhead protocol like UDP/IP.

Hereinafter, in all instances where error-responsive TCP/IP is used as an exemplary transport control protocol, TCP/IP may be replaced with a lower-overhead protocol such as UDP/IP, especially on a connection where loss of packets or data is acceptable (e.g., to reduce data overhead and increase image streaming rate). Either of error-responsive TCP/IP or lower-overhead UDP/IP may be replaced by a successor protocol (i.e., an Internet protocol that succeeds error-responsive TCP/IP or low-overhead UDP/IP as a standard).

The network interface device 236 is installed in the slot interface 232. The network interface device 236 is a card (e.g., PCMCIA) such as, but not limited to: an analog or digital (V.34, 56K, V.90, etc.) modem for use on POTS lines; an Ethernet adapter for connecting to a standard Ethernet LAN (e.g., 10BaseT) using the transport control protocol (e.g., TCP/IP); an ISDN modem connectible to an ISDN terminal adapter; an XDSL adapter; a cable modem; an ATM adapter; a T carrier terminal adapter connection; an adapter for satellite connection; an adapter for microwave connection; an adapter for wireless connection; an adapter for serial transmission over a high speed external serial bus, e.g., USB or IEEE 1394; or an adapter for data transmission over public power lines. If a telephone-type modem (e.g., analog, digital, ISDN) is used as the network interface device 236, a "telephone transmission protocol" (e.g., Point-to-Point Protocol: PPP) application is provided in the NVRAM 242 and may be appropriately loaded and executed by the microcontroller 200 (e.g., together forming a "telephone conversion device") when necessary.

The camera 1 includes an image-forming optical system 245, which forms an image of a particular scene on an image pickup (e.g., CCD or CMOS) 248. A viewfinder optical system 244 allows the user to view the scene passing through the image-forming optical system 245. Although FIG. 3 depicts a viewfinder optical system 244 and image-forming optical system 245 that share an objective lens, and in which a half-mirror is used to distribute light between the systems 244, 245, each of the systems 244, 245 alternatively may be formed with dedicated lenses, i.e., the view finder optical system 244 and image-forming optical system 245 could be two separate optical systems having separate optical axes.

Scanning of the image pickup 248 is driven by an image pickup driver 252 (e.g., CCD, CMOS, or infrared pickup driver) connected to the microcontroller 200 (e.g., via a GPIO pin or otherwise), which drives the image pickup 248 to scan and transfer accumulated image data to an image pickup circuit 250. The image pickup 248 is, in this embodiment, provided with a complementary color filter (e.g., a filter covering each group of four pixels on the image pickup 248 with a two-by-two matrix of Mg, Ye, Cy, G filter elements) allowing the capture of a color image (e.g., a ¼" color CCD). Alternatively, the image pickup 248 may be provided with a mechanical field sequential color filter switcher having a plurality of color filters successively movable in front of the image pickup 248, and a circuit to assemble successive image captures taken through the different color filters into a full color signal.

Further, as noted above, the image pickup 248 may be an infrared sensor suitable for generating a thermograph by known techniques. In such a case, the lenses discussed herein may be formed from infrared transmitting material, e.g., chalcogenide glass, flouride glass, zinc selenide, germanium, or silicon, and image processing circuitry discussed below preferably includes color translation routines to differentiate infrared frequency gradients into hotter and cooler color areas in a resulting thermograph.

The image pickup circuit 250 may includes conventional circuitry necessary to assemble an analog image signal from the image pickup 248, including image processing circuitry to convert the image pickup signal to a luminance (Y) signal and two color difference signals (Cb—blue, Cr—red). As is well known in the art, a full color signal may be synthesized from the YCbCr signal group (e.g., 4:2:2).

The analog image signal is converted to a digital signal by an A/D convertor 246, and passed to the image memory 220 (e.g., a RAM capable of storing at least one high resolution color image) via the compression engine 224. The compression engine 224 preferably integrates a memory (DRAM) controller 226 for controlling the image memory 220. One suitable image compression engine 224 integrating a memory controller 226 is the Fuji MD2205B, available from Fujifilm Microdevices. A suitable image compression engine that requires a separate memory controller is the Fuji MD36050X, for example, in conjunction with the Fuji MD0204 memory controller, both also available from Fujifilm Microdevices.

The microcontroller 200 controls the compression engine 224 to compress an image or images held in the image memory, according to attributes assigned to that particular image (as described later), including compression to a desired (e.g., JPEG) compression level. When a particular image is compressed, the compressed image is stored, along with (e.g., JPEG control and time/date/message stamping) header information, in a general purpose (GP) memory (DRAM) 228 available on the parallel bus 234 of the microcontroller 200. The microcontroller 200 also is capable of adjusting the resolution of images stored in the image memory on a continuous scale with preferred preservation of aspect ratio (although aspect ratio may be altered if necessary), either before or after storage therein (e.g., 640*480, 320*240, 160*120; 80*60, although any resolution may be set).

The camera 1 is further provided with an integrated DC power supply 217 (e.g., 12 V), which provides power to all of the components of the camera 1. The DC power supply may incorporate an AC adapter, but the AC adapter is preferably provided outside the camera 1 in order to reduce the size of the camera. In this case, the AC adapter plugs into a conventional AC outlet, and may be a "Universal" AC adapter connectible to various worldwide AC supplies.

As shown in FIGS. 4A and 4B, the integrated Internet camera is connectible to the Internet via a telephone system 302 or local network 316, depending on the network interface device 236.

FIG. 4A shows an arrangement for connection of the camera 1 to the Internet in combination with a modem as a network interface device 236. The camera 1 is connected, using, e.g., PPP (telephone transmission) and TCP/IP (transport control), to a local or remote ISP via a telephone system (or cable network) 302. A user ID and password (i.e., network authentication) supplied by the camera 1 (via the initial login, as described below) gives the camera access to a local shell account 306 (shell #1) provided by a local ISP 304. In the context of this specification, "local shell account" indicates a shell account accessed by the camera 1 via a "direct" connection and initial login. The local shell account 306 provides access to a user directory, in which the user may store HTML files, the compressed image files, user scripts, controls, and other files necessary to create and allow access to a Web page.

Notably, the user directory stores compressed image files referenced by, or linked to, the Web page and viewable by any remote user using an accessing device, e.g., a personal computer 310 equipped with a Web browser linked to the Internet 308. Once the camera 1 is logged in to the local shell account 306, the camera 1 may upload (e.g., JPEG) image files from the GP memory 228, according to controlling file attributes and destination information (described below) to the local user directory via the provided file transfer (e.g., FTP) application. Any Internet 308 user may then access and view the uploaded (e.g., JPEG) images from the user directory of the shell account via an accessing device, e.g., a personal computer 310 and browser. In the context of this specification, the personal computer 310 may alternatively be, e.g., an integrated television set or telephone including a Web browser, a network computer or server, a "dumb" terminal with a mainframe or minicomputer, a smart terminal with a mainframe or minicomputer, or any configuration that may act as an accessing device.

Furthermore, once the camera 1 is connected to the local ISP 304, access to the Internet 308 at large is provided, and the camera 1 may also access a remote shell account 314 (shell #2) provided by a remote ISP 312 and accessible via FTP (with an appropriate FTP user ID and password). JPEG image files may be stored and linked at the remote shell account 314 identically to that described above with the local shell account 306. Accordingly, the camera 1 is connected locally to the Internet at a first location, but may store images at a second location anywhere in the world, allowing administration of a Web page provided with images from the integrated Internet camera 1 perhaps thousands of miles away.

FIG. 4B is similar to FIG. 4A in that the camera 1 has access to a local shell account 306, the Internet, and a remote shell account 314 via similar mechanisms. However, in FIG. 3B, the arrangement for connection of the camera 1 to the Internet is in combination with a network adapter as a network interface device 236. The camera 1 is connected, using the transport control protocol (e.g., TCP/IP), to a local intranet or LAN 316, which is further connected to the Internet. Once the transport control protocol (e.g., TCP/IP) connection is established between the camera 1 and the local intranet or LAN 316, the camera 1 may upload pictures as described above with respect to FIG. 4A.

Figure 5:
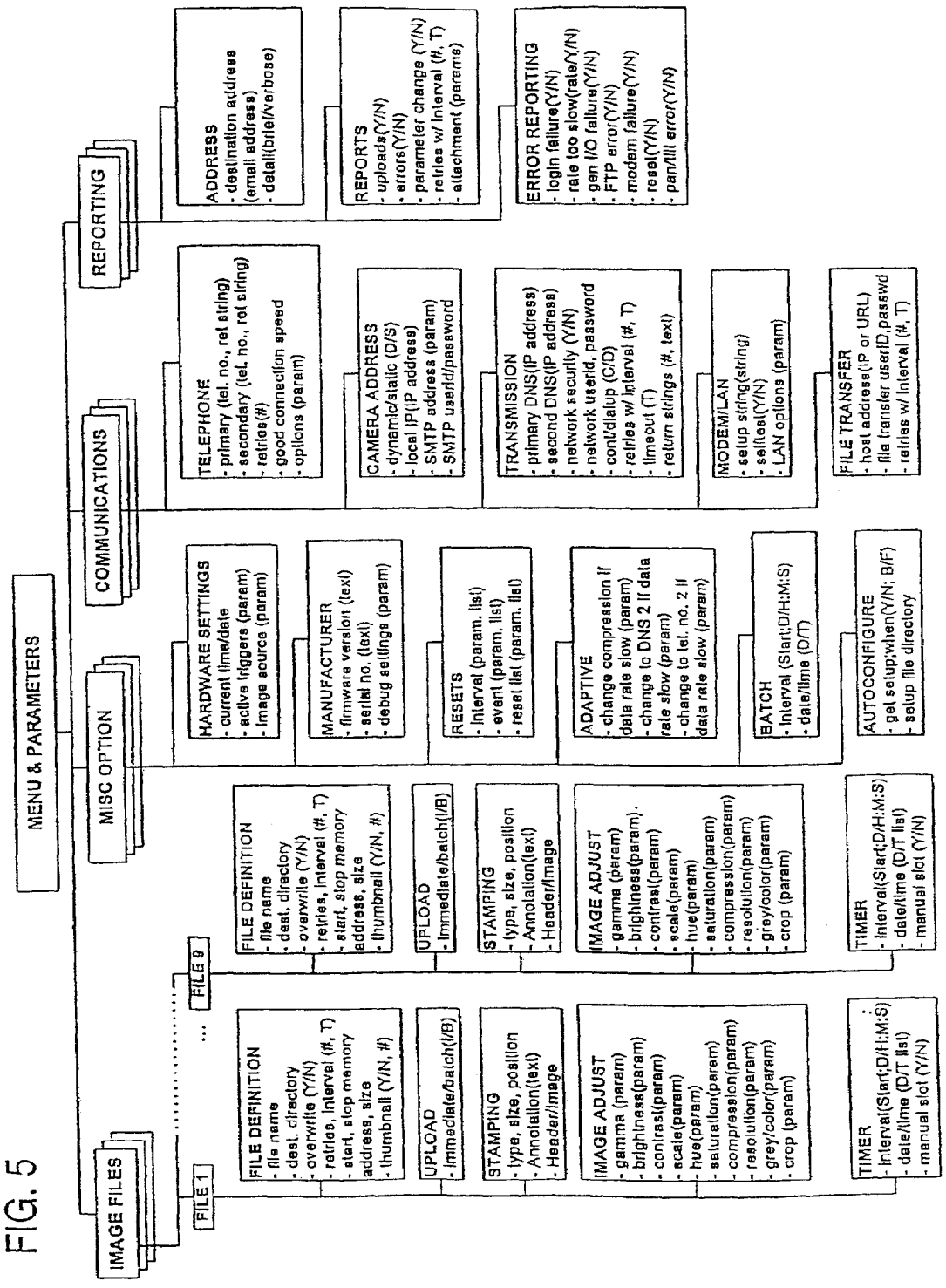
FIG. 5 is a block diagram showing a menu and parameter storage structure of FIG. 2.

FIG. 5 shows an example of a menu and parameter storage structure in the NVRAM 242 (or shadowed in the GP memory 228 when the camera 1 is operating) readable and writable by the user via the button/switch input 214 in combination with the display 218, via the serial/IrDA port 210 in combination with a personal computer, or updatable by the camera 1 itself according to automatic setup/configuration procedures. As shown in FIG. 5, the camera 1 stores numerous variables and parameters (e.g., in the NVRAM 242) that control the operation thereof, and which may be adjusted by the user via the menu structure or via direct commands received by the microcontroller 200, e.g., via the serial/IrDA port 210. The menu structure may be made accessible via a tabular or line-mode text interface, a graphical user interface, or any other user interface responsive to the button/switch input 214 or serial/IrDA port 210 that allows the parameters to be set and stored. The menu and parameter storage structure stores parameters in at least four categories: IMAGE FILES, MISC (miscellaneous) OPTION, COMMUNICATIONS, AND REPORTING.

The IMAGE FILES menu/storage area allows the setting of flags, attributes and parameters for a plurality of images to be captured, adjusted, and uploaded by the camera. In this embodiment, a plurality of image slots (e.g., FILE 1 . . . FILE 9) are available for individual control, and each of the IMAGE FILES variable groups is provided for each image slot. Nine image slots are merely exemplary, and the camera 1 may store different image files and accompanying parameters to the capacity of provided memory. A FILE DEFINITION variable group stores several parameters defining a file name, a destination directory, whether a file of the same name should be overwritten, and the number of retries and interval therebetween should the camera 1 fail to upload the image. The filename may also be set automatically by the camera 1 according to an alphanumeric definition string, e.g., if "vcam###" is entered as a filename, the camera may increment every recorded image name (e.g., "vcam001", then "vcam002", etc. The FILE DEFINITION variable group also stores a start and stop memory address and image file size when memory for the image slots is dynamically allocated, as well as a parameter defining whether the image slot is a thumbnail image (a smaller image used for browsing images) of another slot and the number of the thumbnail's parent image slot. When an image slot is designated as a thumbnail slot, the filename of the thumbnail slot is preferably automatically set to a derivative of the parent image slot, e.g., a thumbnail slot corresponding to a parent slot with a filename of "vcam001" would be automatically named "vcam001t". An UPLOAD variable group stores a parameter defining whether the file should be uploaded immediately (e.g., immediately after a release signal is acted upon and the image file stored), or at the next batch upload operation. A STAMPING variable group stores several parameters defining whether stamping is appended to file header information and/or superimposed on the image, stamping of a date and/or time and/or user-defined annotation or message, and the annotation itself. An IMAGE ADJUST variable group stores several color property parameters defining increase or decrease of gamma, brightness, contrast, hue, saturation, and luminance, as well as settings for (e.g., JPEG) compression level, resolution, whether an image is stored as a greyscale or a color image, as well as any cropping of the image specified, e.g., coordinates of opposite corners of the region to be cropped. The parameters stored in each of the IMAGE ADJUST variable groups, corresponding to each color property of the image (e.g., contrast, hue, etc.), quantify an increase, decrease, or no change in a particular property for a particular image slot. A TIMER variable group stores several parameters defining capture at weekly, daily, hourly, and by-minute intervals, streaming (i.e., continuous capture and transmission as fast as the camera 1 can manage), capture at a set date and/or time, or whether the image slot is one available for event-based capture, including "manual" capture (e.g., by a depression of the release button 214e, or a release signal received from a trigger input 211 or GPIO pin 219).

Optionally, instead of designating one image slot for each thumbnail, according to the variable groups, any image slot may be designated as one to be accompanied by a thumbnail image file. In such a case, the microcontroller, when writing the parent image file, dynamically creates a smaller thumbnail image by scaling the parent image, and sends the thumbnail image using a file name derived from the parent file name (e.g., using the parent file name as a base, but having a predetermined prefix or suffix denoting that the image is a thumbnail). Further alternatively, an image slot may be designated as a thumbnail grid "collage" slot, and, e.g., smaller (e.g., 80*60) thumbnail images of each recorded slot stored in predetermined X, Y positions in the thumbnail grid "collage" slot as a master "collag" image. That is, a master grid "collage" image would be made up of smaller thumbnail images of the remaining, regular image slots, assembled into a single, larger grid "collage" in rows and columns. In such a case, when a thumbnail is to be sent accompanying any image slot, the microcontroller 200 may read the corresponding thumbnail image from the predetermined position in the master grid "collage" image and transmit the thumbnail image with an automatically assigned thumbnail file name. E.g., if image slot 2, having a filename "vcam002" is designated as a slot accompanied by a 80*60 thumbnail, the microcontroller 200 reads an image portion of the thumbnail slot from a position derived from the second regular image slot (e.g., (81, 0) to (160, 60)) and sends the thumbnail image as, e.g., "vcam002t". In such a case, the entire thumbnail grid "collage" image in the thumbnail grid "collage" slot may be separately sent as any other image, which provides an easy way to preview or check all the images currently stored in the camera 1.

The COMMUNICATIONS menu/storage area allows the setting of communication parameters. A TELEPHONE variable group stores a primary ISP telephone number and return string, a secondary ISP telephone number and return string, the number of retries and interval therebetween should the camera 1 fail to succeed in making a telephone transmission protocol (e.g., PPP) connection, a "good" connection speed, and options for telephone connections. The options include which telephone transmission protocol will be used (e.g., PPP or SLIP), and parameters for the use of the chosen telephone transmission protocol (e.g., type of authorization, or whether the "client" or "server" initiates communication). The return strings are communications from the called ISP connection that the camera 1 uses as prompts for sending, e.g., user identification and password information. A CAMERA ADDRESS variable group stores whether a local (e.g., IP) address of the camera 1 is set dynamically (provided by the Internet server) or is static (a predetermined address for the camera 1), the local (e.g., IP) address if static, and a mail (e.g., SMTP) server address for outgoing E-mail, as well as an SMTP user identification and password as necessary. A TRANSMISSION variable group stores a primary and secondary name server (e.g., DNS) address that stores URL information allowing the camera 1 to access remote (e.g., IP) addresses as directed by a name (e.g., DNS) server, a flag that indicates whether network authentication is necessary, a user ID and password information for network authentication, a variable that indicates whether the camera 1 should maintain continuous communication (e.g., TCP/IP) or dial-up/connect only when an upload is indicated, the number of retries and interval therebetween should the camera 1 fail to make a transport control protocol connection, a timeout should the camera 1, e.g., make a connection but receive no further communications or return strings, and return strings (as previously noted, as prompts for camera action) associated with the ISP connection. A MODEM/LAN variable group stores a setup control string for a modem provided as the network interface device, a flag denoting whether the modem or network interface device should self-test, e.g., upon startup, and LAN options. The LAN options include information necessary or useful in establishing local network communications, e.g., a gateway address, subnet mask, and LAN address for the camera 1. A FILE TRANSFER variable group stores an file transfer protocol (e.g., FTP) host address (a predetermined Internet address such as, e.g., an IP address or URL), user ID and password for accessing the shell account on the Internet in which images will be stored, and the number of retries and interval therebetween should the camera 1 fail to make a file transfer protocol login.

The MISC OPTIONS menu/storage area stores "hardware" settings and setting for special features of the camera 1.

A HARDWARE SETTINGS variable group stores the current time and date, which triggers are active and how the camera responds thereto, and an image source for the camera 1 to perform operations on. For example, trigger settings may include (for, e.g., as in the fifth embodiment, 2 input triggers and 1 output trigger) settings that indicate image capture on a HIGH signal at either or both input triggers, a HIGH output on the output trigger on any input trigger activity, or image capture on a press of button 214e, and combinations of these settings. Image source setting may include settings that indicate that the image source is defined by a switch set on the camera (e.g., switch 214g of the fifth embodiment), that an external composite video signal is used for transmission, that the internal video signal is used for transmission, or that, e.g., only the internal luma ("Y" of YCrCb) is used for transmission (i.e., a black and white signal requiring less bandwidth). A MANUFACTURER variable group stores settings that are set by or available primarily to the manufacturer, e.g., the version number and identifier for the firmware in the NVRAM 242 as most recently updated, a serial number for the camera itself (which may be used as a unique camera identifier to allow Internet access) or debug settings that prompt the camera to respond with appropriate debugging information and actions when the camera 1 is tested by the manufacturer or a repair/maintenance facility. The hardware settings may be of limited access, e.g., accessible only via commands received via the serial/setup port, and invisible to the user (e.g., not available via any menu operations), or available only via the entry of an access code or predetermined button combinations defining an access code. A RESETS variable group defines circumstances under which a "soft reset" is performed (e.g., a re-initialization as in step S10 described below), including whether a soft reset is interval-based and an accompanying interval, whether a soft reset is event-based and a list of corresponding event codes (e.g., generated errors and repeats thereof), and a reset list defining which (all or some) applications/drivers/memory spaces are reset, initialized, or cleared. An ADAPTIVE variable group activates adaptive functions, such as changing the (e.g., JPEG) compression ratio of the image depending on the upload data transmission rate, changing to the secondary telephone number for telephone transmission protocol (e.g., PPP) access if no connection is made, or changing to the secondary DNS address if no connection is made. A BATCH variable group stores intervals and/or dates at which batch uploads of files will be executed. An AUTOCONFIGURE variable group stores flags that determine if (Y/N) and when (next Batch, next File) the camera 1 will retrieve a setup/configuration file containing a set of new parameters when making an FTP connection to upload an image, and a parameter defining the setup file directory.

It should be noted that the configuration/setup file is preferably encrypted, and preferably recoverable via an additional password key (not shown) stored in the MISC OPTIONS menu/storage area. Any appropriate encryption method may be used, with encryption and decryption upon writing and reading performed by the microcontroller 200.

The REPORTING menu/storage area allows the setting of error and status reporting parameters. An ADDRESS variable group stores a destination (E-mail) address to which error, attachments (image files) and status reports (with or without attachments) are sent, and a flag that sets the level of detail of the reports. A REPORTS variable group defines what is reported, including whether errors are reported, whether each (e.g., interval or timed) upload is reported, whether changes in the parameters or settings are reported, whether an image file attachment will be sent as a report and which slot(s) will be sent (including the possibility of an entire batch list), and the number of retries and interval therebetween should the camera 1 fail to report. An ERROR REPORTING variable group defines which types of errors are reported, including errors such as login failure, data rate too slow, general I/O error, FTP error, modem failure, reset, and pan/tilt error (if applicable—primarily for the second embodiment).

Each of the variable groups is accessible as required according to the control procedures described hereinafter, or according to control procedures readily ascertainable to one skilled in the art in view of the functions described in association with each variable. Where an interval or specified date and time are given, the microcontroller 200, in combination with the real time clock 208, maintains individual timers (e.g., T1, T2 ... Tn as shown in FIG. 3) for each of the intervals or specified date and time. That is, at least one timer for each image slot and at least one batch timer are maintained. Each timer may count intervals from a given start time, or be set to count down to one or more specific dates and times, in combination with the real time clock 208 and microcontroller 200 forming one or more scheduling devices.

Figure 6:
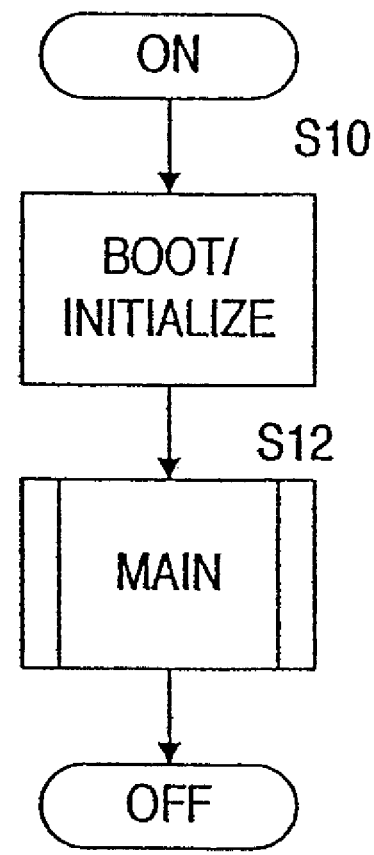
FIG. 6 is a flow chart of an initialization routine of the integrated Internet camera shown in FIG. 2.

FIG. 6 describes a control procedure initiated when the camera 1 is "turned on". The camera 1 may be, as previously described, actually powered at all times when connected to the appropriate power supply. However, when an "on-off" button is operated, or the power supply is connected, the camera 1 may perform the initialization and main steps detailed in FIG. 6. As shown in FIG. 6, after the camera 1 is "turned on", the microcontroller 200 is first "booted" and initialized at step S10. In step S10, the necessary routines for basic operation of the microcontroller 200 are loaded, according to the boot ROM 230, from the NVRAM 242 into the memory 228. These routines/applications/drivers include at least the transport control (e.g., TCP/IP) stack, a driver that recognizes the network interface device 236, and the user interface and operating system (including boot messages for display). Subsequently, data and applications may be called from or loaded to the NVRAM 242, the compression engine 224, and the GP memory 228 as needed to carry out the various functions of the system. The initialization procedure may use values and parameters stored in the COMMUNICATIONS: MODEM/LAN variable group to initialize the network interface device 236. At step S12, the program begins a main routine, as shown in FIG. 7.

Figure 7:
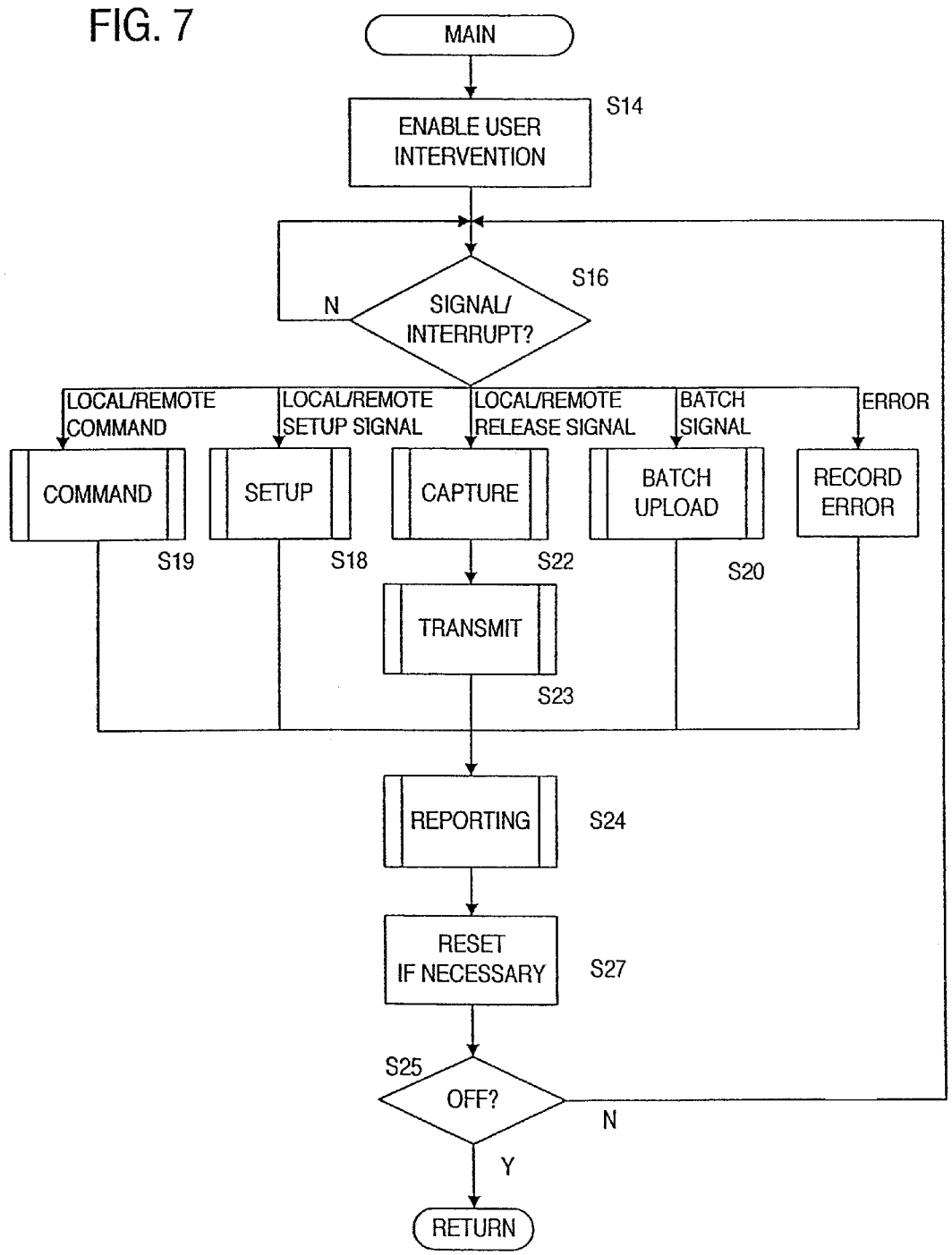
FIG. 7 is a flow chart of a main routine of the integrated Internet camera shown in FIG. 2.

FIG. 7 shows an exemplary logic flow of the main routine of the camera 1. As shown in FIG. 7, the main routine enables "user" intervention, including intervention via the interrupt controllers 213, GPIO pins 219, or trigger inputs 211 at step S14. At this point, initialization is completed, and the microcontroller 200 may recognize commands from the button/switch input 214, from the GPIO pins 219, from the trigger inputs 211, from the serial/IrDA port 210, or "automatic" commands from the various timers or other interrupts (described later).

The microcontroller 200 is preferably responsive, via the serial/IrDA port or internal issuance (e.g., button, timer, trigger, event), to a command set having a robust syntax, and controls the camera according to commands in the command set. In the present embodiment, an "escape code" command set is preferred for simplicity and stability. For example, a command to which the camera responds may be arranged to have a three field header preceding any data accompanying the command—a one byte escape code (conventionally 0x1B hexadecimal), a one byte command code (permitting 256 different commands in the set), and a one byte command data length (permitting up to 256 bytes of command-specific data to be exchanged). The length field is always included, even if no data accompanies the command. Commands fall into two primary categories: parameter setting, and task execution. The camera also follows a response syntax similar to the command syntax, i.e., an escape code, an echo of the command code, and a command data length, followed by any data to be returned by the camera. Since the camera returns large amounts of data, including images, upon request, the command data length in the response syntax is preferably three bytes, permitting up to 16 Mb of command-specific data to be returned by the camera.

The following routines and functions are described without specific reference to a particular command set, although the operations described are preferably initiated, performed, and/or terminated using a command set as described above. FIG. 16B, described below, shows a routine for handling commands received as part of, e.g., a command set.

At step S16, the microcontroller 200 waits for one of: a command (e.g., received via the serial/IrDA port 210, or generated by one or more button presses, a timer, or internal processes or events); a setup signal (i.e., a button press of one of buttons 214*c-d* or a setup signal received from the serial Ir/DA port 210); a batch upload signal (i.e., a depression of button 214*e* when in setup mode, a batch upload signal received from the serial Ir/DA port 210, or the batch timer expiring); or a release signal (i.e., a button press of button 214e when in main operation mode, a release signal received from the serial Ir/DA port 210, any image slot timer expiring, or a signal received from a GPIO pin 219 or trigger input 211). If a command signal is detected at step S16, the microcontroller 200 proceeds to a command routine at step S19 (described later with reference to FIG. 16B), and when the command routine is completed, proceeds to step S24. If a setup signal is detected at step S16, the microcontroller 200 proceeds to a setup routine at step S18 (described later with reference to FIG. 16A), and when the setup routine is completed, proceeds to step S24. If a batch upload signal is detected at step S16, the microcontroller 200 proceeds to a batch upload routine at step S20 (described with reference to FIG. 14), and when the batch upload routine is completed, proceeds to step S24. If a release signal is detected at step S16, the microcontroller 200 proceeds to a capture routine at step S22 and a transmit routine at step S23 (described with reference to FIGS. 8 and 9), and when the capture and transmit routines are completed, proceeds to step S24 (a reporting routine described below with respect to FIG. 15). Upon the completion of step S24, control proceeds to step S27.

The setup signal, batch upload signal, or release signal may be considered "commands" handled by the routine of FIG. 16B, but in this embodiment, are handled independently of received "commands", although the called routines may also be entered via the receipt of an appropriate command.

In step S27, the camera 1 may perform a "soft reset" according to the values stored in the RESETS variable group. That is, depending on the RESETS variable group, the camera 1 may perform a interval-based "soft reset" (e.g., once a day, once a week), or an event-based "soft reset" (e.g., after a certain number of failures to connect or other generated errors). In either case, all or some of the applications/drivers/memory spaces are reset, initialized, or cleared depending on the RESETS variable group. Step S27 may return the camera to step S10 of FIG. 6 if the entire camera 1 is to be reset or re-initialized, again depending on the contents of the RESETS variable group. This feature allows the camera 1, e.g., to restart occasionally to clear out old data, or to reset if unable to get a connection, without the user being required to visit a remote site.

Figure 8:
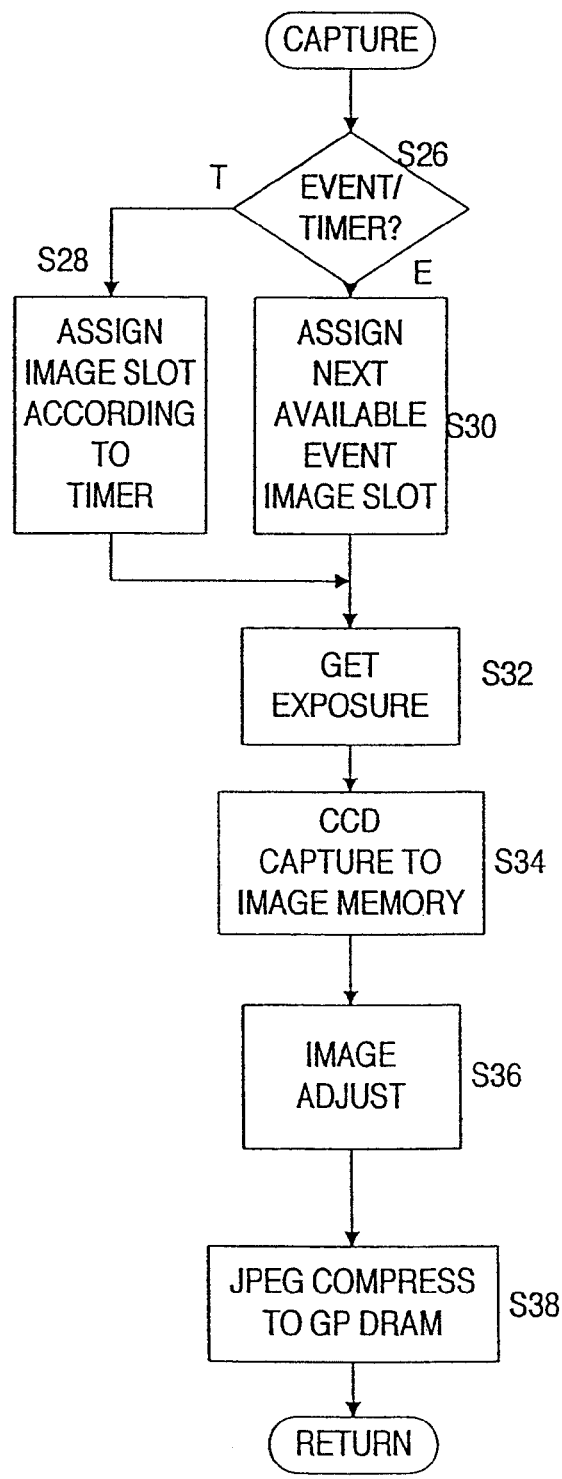
FIG. 8 is a flow chart of an image capture routine of the integrated Internet camera shown in FIG. 2.

If the camera is not "turned off" (e.g., via a switch on the button/switch input 214) at step S25, then the microcontroller 200 returns to step S16 to cycle through the main routine again. If it is determined that the camera 1 is "turned off" at step S25, then control returns to the main routine, where the camera 1 shuts down (e.g., enters an idle state). FIG. 8 shows a capture routine for capturing, compressing, and storing an image. As shown in FIG. 8, the capture routine first checks at step S26 whether the indicated image capture is event based, i.e., according to user or trigger intervention, or whether the indicated image capture is according to a timer (for example, according to a flag set in step S16 to indicate which signal was received). If the capture signal is from a timer, control proceeds to step S28, where the image capture slot is identified according to the timer that expired. Control then proceeds to step S32. If the capture signal is event-based, control proceeds to step S30, where the image slot is identified as the least recently filled event slot of those slots identified as available event slots in the IMAGE FILES: TIMER variable groups as shown in FIG. 5. Control then proceeds to step S32.

In step S32, an exposure is set, i.e., the microcontroller 200 initiates a capture (for exposure setting purposes) of the scene at which the camera 1 is presently pointed. However, instead of storing this capture, the luminance of the overall image is cumulatively calculated or averaged by the image pickup circuit 250 in combination with the microcontroller 200. The average may be taken from all the pixels of the image or from any portion thereof. The luminance of the overall image is then used in a conventional calculation to set an appropriate exposure time (i.e., light accumulation time) for a subsequent image capture by the image pickup 248.

In step S34, the image pickup 248 is driven by the driver 252 to accumulate light, i.e., to store an image. The image is then dumped to the image pickup circuit 250, where it undergoes processing to assemble an analog image signal from the image pickup 248, including image processing to convert the image pickup signal to a luminance (Y) signal and two color difference signals (Cb—blue, Cr—red). Subsequently, the A/D converter 246 converts the YCrCb signal to a digital image signal, which is passed by the compression engine 224 and memory controller 226 to the image memory (at this point, without compression). Control then proceeds to step S36. The described operations are substantially analogous for an infrared sensor as described, but also include infrared frequency gradient to color transformation to show hotter or cooler color areas of the image.

In step S36, image adjustment, including color adjusting and time/date/message stamping, is performed on the image in image memory 220. The microcontroller 200 controls the color adjusting circuit 256, compression engine 226, and character generator 254 to adjust the image (increase, decrease, or maintain a property) according to the parameters and settings stored in the IMAGE FILES: IMAGE ADJUST and IMAGE FILES: STAMPING variable groups, and according to the image slot identified in steps S28 or S30. Depending on the IMAGE FILES: STAMPING variable group, stamping may be storage of the date, and/or time, and/or annotation as file header information in the appropriate slot in the GP memory 226, and/or superimposition of appropriate generated characters on the image in the image memory 220. Control then proceeds to step S38.

In step S38, the compression engine 226 is controlled by the microcontroller 200, according to settings stored in the IMAGE FILES: IMAGE ADJUST, to compress the image in the image memory 220 to the appropriate slot (identified in steps S28 or S30) in the GP memory 226. If the MISC OPTION: ADAPTIVE parameter is set to change (e.g, reduce or increase) the image compression depending on the data rate, the compression engine 226 is then set to increase the compression level by a predetermined amount if the data rate is lower than a predetermined rate, or decrease the compression level by a predetermined amount if the data rate is higher than a predetermined rate. Subsequently, control returns (if the capture routine is called from step S22 in FIG. 7) to step S23.

Figure 9:
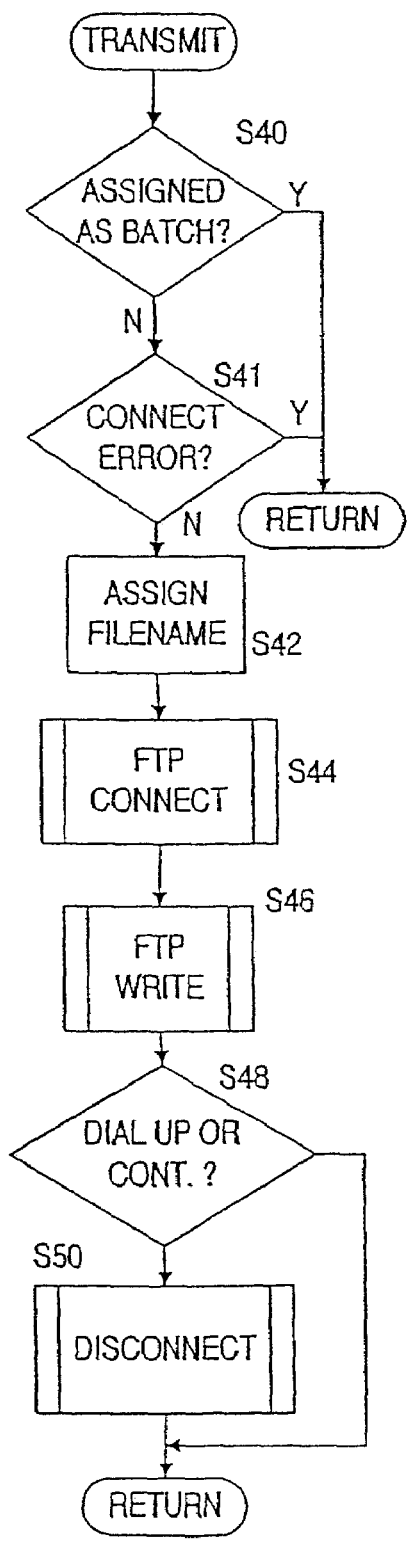
FIG. 9 is a flow chart of an image transmit routine of the integrated Internet camera shown in FIG. 2.

From step S23 of FIG. 7, the main routine passes control to the transmit routine shown in FIG. 9. As shown in FIG. 9, the transmit routine first, at step S40, checks if the slot identified in one of steps S28 or S30 is an image slot designated for batch operations; i.e., whether or not the settings stored in the IMAGE FILES: UPLOAD variable group indicate that the image in the image slot is to be uploaded immediately (e.g., following capture), or whether the image in the image slot is to be uploaded at the next batch upload operation. If the image in the image slot is designated for the next batch upload operation, control returns to the main routine following step S24, whereupon step S16 is again executed to wait for a subsequent signal or interrupt. This is true whether the image capture was initiated by user or trigger intervention or by a timer expiration.

If the image in the image slot is designated to be immediately uploaded, control passes (via step S41, which checks for a connect error, and step S42, which assigns a filename) to step S44, which calls the FTP connect routine (described below with reference to FIG. 11) in which the camera makes a connection to the designated shell account via FTP and the network interface device 236. The designated (single) image is then uploaded to the designated shell account (via the file transfer application, FTP) in step S46. Subsequently, control passes to step S48, in which the microcontroller 200 checks whether the camera is set to continuous transport control protocol (e.g., TCP/IP) connection or dial-up operation in the COMMUNICATIONS: TRANSMISSION variable group. If the camera 1 is set for continuous connection (for example, in the case where intervals between images are very short, or where image streaming is set in the IMAGE FILES: TIMER variable group for any image slot), control returns to the main routine following step S24 without disconnecting the existing transport control protocol (e.g., TCP/IP) connection (made in the FTP connect routine), whereupon step S16 is again executed to wait for a subsequent signal or interrupt. If the camera 1 is set for dial-up connection, control proceeds to step S50, where the existing transport control protocol (e.g., TCP/IP) connection may be dropped and/or the modem hung up in a disconnect routine shown in FIG. 10. In this context, it should be noted that "dial-up" does not necessarily mean dialing of a telephone, but rather that the connection is newly made when substantive data (excepting handshaking, etc.) is to be transmitted and broken or dropped when data is not to be transmitted.

Figure 10:
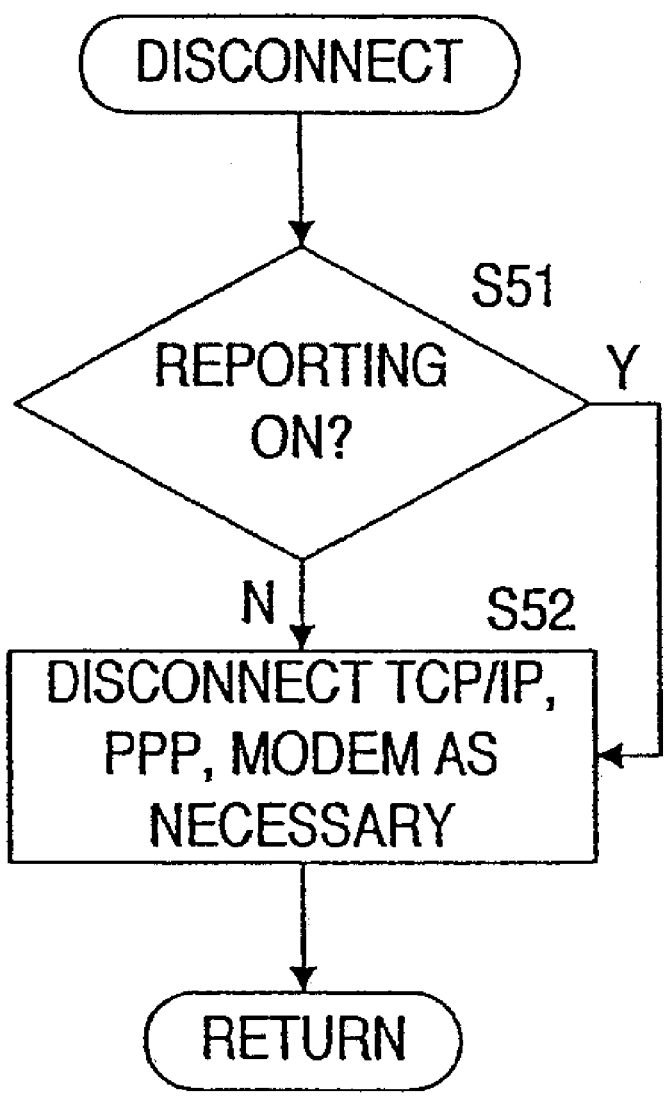
FIG. 10 is a flow chart of a disconnect routine of the integrated Internet camera shown in FIG. 2.

As shown in FIG. 10, in the disconnect routine, the microcontroller 200 checks whether reporting is ON according to the REPORTING: REPORTS variable group (i.e., whether any of uploads, errors, or setup updates are set to be reported) in step S51. If reporting is ON, the microcontroller 200 aborts the disconnect routine and returns to the originating routine (in this case, disconnecting is eventually performed by the reporting routine described below with reference to FIG. 15). If reporting is not ON, the microcontroller 200 disconnects, as appropriate, the transport control connection (TCP/IP), telephone transmission connection (e.g., PPP), and modem connection (as appropriate) in step S52, and then returns to the originating process.

Figure 11:
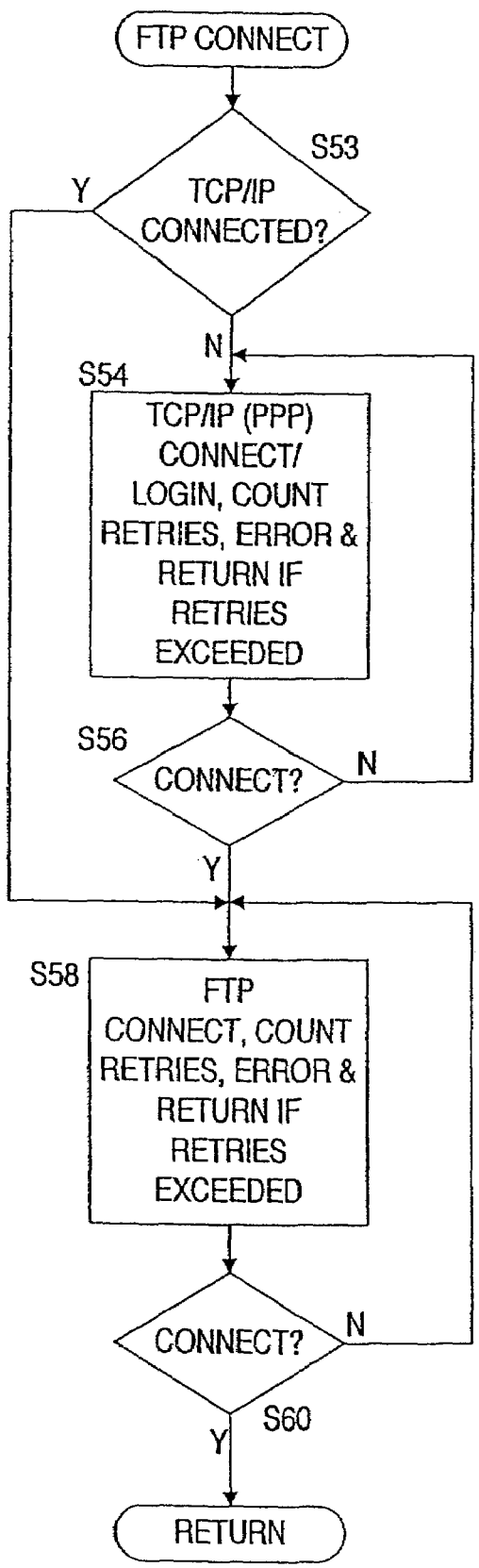
FIG. 11 is a flow chart of an file transfer connect routine of the integrated Internet camera shown in FIG. 2.

As shown in FIG. 11, the FTP connect routine (e.g., called at step S44) makes a file transfer protocol (e.g., FTP) connection to the destination server and shell account/user directory. In step S53, the microcontroller 200 checks whether the camera has an existing transport control protocol (e.g., TCP/IP) connection (e.g., in case the camera has not disconnected from the initial login as in step S48). If the camera has an existing connection, control proceeds to step S58, at which the file transfer (e.g., FTP) application logs in. If the camera has no existing transport control (e.g., TCP/IP) connection, control proceeds to step S54.

In step S54, the microcontroller 200 uses the parameters stored in the COMMUNICATIONS: TELEPHONE; CAMERA ADDRESS; and TRANSMISSION variable groups to determine what steps must be taken to establish a transport control (e.g., TCP/IP) connection, and attempts to make the connection.

For example, if the network interface device 236 is a network card, the transport control (e.g., TCP/IP) login process may take one of two forms. In one scenario, no network authentication is necessary, and the transport control login is relatively simple, including notifying the local network that the camera is present and requesting a dynamic (e.g., IP) address (or notifying the local network of the camera's internet address—IP address or URL). Subsequently, the user may use the file transfer application (e.g., FTP) to reach any IP address on the Internet by logging in with only the file transfer application user ID and password (which may be set to "anonymous" for public access), e.g., the file transfer application acting as the sole network authentication application. In this first scenario, the camera 1 is set for "network security: N" in the COMMUNICATIONS: TRANSMISSION variable group, and uses only internet (IP or URL) address information from the COMMUNICATIONS: TRANSMISSION variable group. In another scenario, the camera must pass network authentication, which will demand a user ID and password for access to the network. In this second scenario, the camera 1 is set for "network security: Y" in the COMMUNICATIONS: TRANSMISSION variable group, and uses the user ID and password in the COMMUNICATIONS: TRANSMISSION variable group as well as requesting a dynamic IP address if necessary, e.g., the transport control application acting as a network authentication application, alone or in concert with the file transfer application as noted above.

Figure 12:
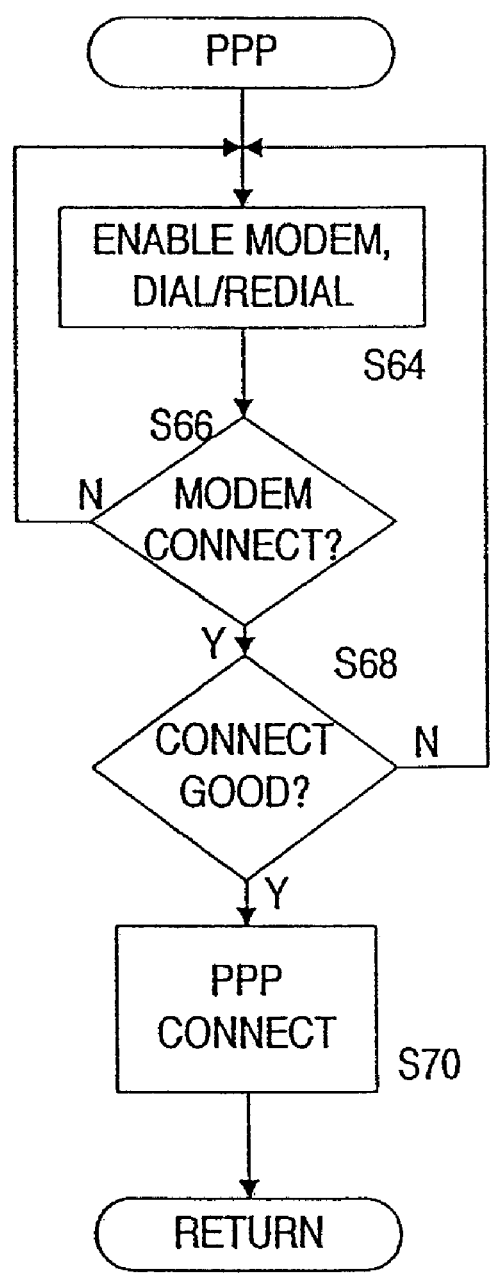
FIG. 12 is a flow chart of a telephone connect routine of the integrated Internet camera shown in FIG. 2.

Accordingly, depending on the settings of the COMMUNICATIONS: TELEPHONE; CAMERA ADDRESS, and TRANSMISSION variable groups, the microcontroller 200 attempts to make a transport control (TCP/IP) connection in step S54. If a modem (requiring the use of telephone transmission protocol, e.g., PPP) is used as the network interface device 236, the microcontroller 200 automatically (e.g., by detecting the modem driver parameters) proceeds to the TELEPHONE routine shown in FIG. 12.

In step S56, the microcontroller 200 checks whether a transport control (TCP/IP) connection has been made, returning to step S54 if no connection is made, or proceeding to step S58 if the connection is successful. The microcontroller 200 also monitors the number of retries in step S54 (as defined in the COMMUNICATIONS: TRANSMISSION variable group, along with the interval therebetween), and exits the FTP connect routine (i.e., returns) when the number of retries (i.e, the number of iterations through steps S54 and S56) has been exceeded, generating an error which may be reported (depending on the contents of the REPORTING: ERROR REPORTING variable group).

In step S58, the microcontroller 200 uses the parameters stored in the COMMUNICATIONS: FILE TRANSFER variable group to attempt to establish a file transfer application (e.g., FTP) login at the destination internet (e.g., IP or URL) address. Usually, the login is effected with a user ID and password for file transfer application (e.g., FTP) access to the network at the destination (e.g., IP) address. The camera 1 uses the user ID and password in the COMMUNICATIONS: FILE TRANSFER variable group. In step S60, the microcontroller 200 checks whether a file transfer application (e.g., FTP) login has been made, returning to step S58 if no login is completed, and exiting the FTP connect routine (returning) if the connection is successful. The microcontroller 200 also monitors the number of retries in step S58 (as defined in the COMMUNICATIONS: FILE TRANSFER variable group, along with the interval therebetween), and exits the FTP connect routine (i.e., returns) when the number of retries (i.e, the number of iterations through steps S58 and S60) has been exceeded, generating an error which may be reported (depending on the contents of the REPORTING: ERROR REPORTING variable group). In the context of this specification, any steps that monitor a number of retries also monitor whether or a successful connection times out (e.g., without receipt of an appropriate return string) according to the specified timeout value, and also carry out the same failed-connection steps when a timeout is recorded (e.g., exiting the routine and generating an error that may be reported).

If a successful file transfer application (e.g., FTP) login is accomplished in steps S58 and S60, or if the process generates an error from a login or connect failure as previously described, control returns to the transmit routine of FIG. 9 at step S46.

If the camera does not use a modem as the network interface device 236, the microcontroller 200 does not perform the TELEPHONE connect routine of FIG. 11. Since the "telephone transmission protocol" establishes a transport control protocol connection over, e.g., telephone lines or other analog transmission lines, the "telephone transmission protocol" is only used in instances where the network interface device 236 is not directly wired or otherwise linked to a medium capable of addressing and being addressed by the Internet using the transport control protocol.

As previously described, if the camera 1 uses a modem as the network interface device 236, the microcontroller jumps to the TELEPHONE routine of FIG. 10 from step S54 of the FILE TRANSFER connect routine in FIG. 11. In the TELEPHONE routine, the microcontroller 200 uses the parameters stored in the COMMUNICATIONS: TELEPHONE variable group. In step S66, the microcontroller 200 enables and/or resets the modem (as the network interface device 236), and dials the primary telephone number. The modem may make a successful connection, may fail to connect, or may encounter a busy signal or no answer. Accordingly, the microcontroller 200 checks whether a connection has been made in step S66. If a connection is made successfully, the microcontroller 200 proceeds to step S68.

However, the microcontroller 200 also monitors the number of retries in step S64 (as defined in the COMMUNICATIONS: TELEPHONE variable group, along with the interval therebetween), and switches to the secondary telephone number (if one has been entered in the COMMUNICATIONS: TELEPHONE variable group) when the number of retries (i.e, the number of iterations through steps S64 and S66) has been exceeded (resetting the number of retries for the secondary telephone number), generating an error which may be reported. The microcontroller 200 then proceeds through steps S64 and S66 in the same manner as with the primary telephone number. If the number of retries has been exceeded using the secondary telephone number, the microcontroller 200 exits the TELEPHONE connect routine (i.e., returns), generating an error which may be reported.

Even if a connection is made successfully, the microcontroller 200 may query the modem and check whether the connection is satisfactory in step S68. That is, if a fast connection (e.g., 28800 bps or higher) is necessary for satisfactory streaming of images (if such is set in an IMAGE FILES: TIMER variable group), it may be unacceptable to connect at a lower rate. If the user has set a "good connection" rate definition in the COMMUNICATIONS: TELEPHONE variable group and the modem connection does not reach the defined rate, at step S68, the microcontroller 200 returns to step S68, treating the connection the same as no connection (i.e., counting a retry). Similarly, since a poor connection is treated the same as no connection, the microcontroller 200 will eventually switch to the secondary telephone number at step S64 if no satisfactory connection can be made on the primary telephone number. If the connection rate is satisfactory, control proceeds from step S68 to step S70. Moreover, if no "good connection" rate is set in the COMMUNICATIONS: TELEPHONE variable group, step S68 is not performed by the microcontroller 200, and control proceeds to step S70.

Step S70 is handled identically to step S54 of the FTP connect routine. That is, once the modem connection is made, the telephone transmission protocol (e.g., PPP) software (also running on the ISP server), forwards packets created by the transport control protocol stack, thereby appearing as a slow transport control protocol (e.g., TCP/IP) connection to the ISP server. That is, if the network interface device 236 is a modem, the transport control (e.g., TCP/IP) login process will use the telephone transmission protocol (e.g., PPP) to connect to an ISP or other dial-in network access, and will almost always need to pass network authentication. In this case, the camera is set for "network security: Y" in the COMMUNICATIONS: TRANSMISSION variable group, and uses the user ID and password in the COMMUNICATIONS: TRANSMISSION variable group. With the telephone transmission protocol (e.g., PPP) as well, the camera 1 requests a dynamic IP address (or notifies the local network of the camera's IP address). Subsequently, control returns to the FTP connect routine, and proceeds through steps S56 (Accordingly, the FTP connect routine will again perform the entire TELEPHONE routine if no transport control protocol connection is made in step S70), S58, and S60 before returning to the transmit routine of FIG. 9 at step S46.

It should be noted that an incorrect user ID or password for, e.g., any of the transport control protocol, telephone transmission protocol, or file transfer protocol connections or logins will return an error at the same point as a failure to connect and is treated in the same manner, and the microcontroller 200 will generate (and record) an error and abandon the attempt to connect after the specified number of retries, as previously described.

Figure 13:
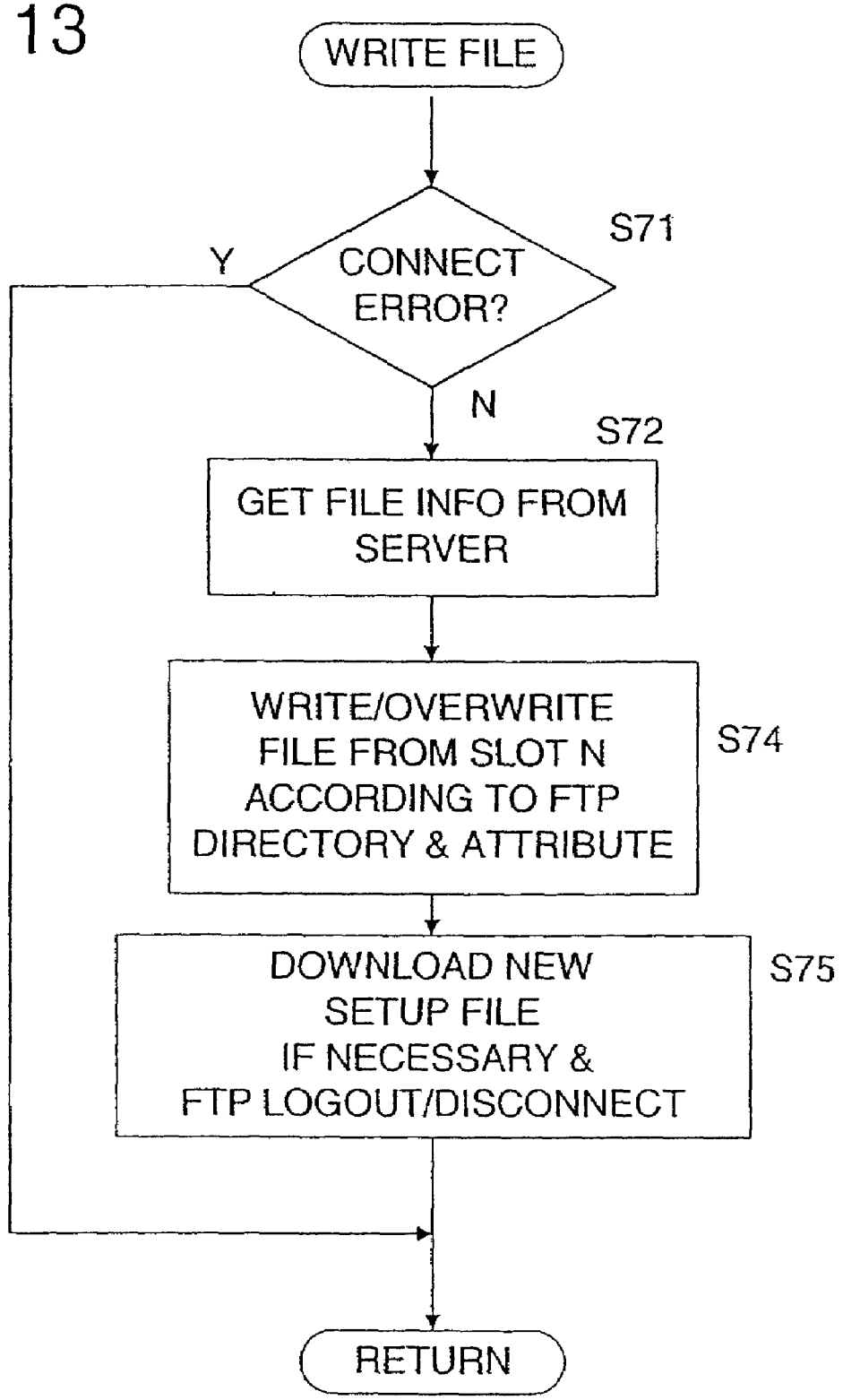
FIG. 13 is a flow chart of a write file routine of the integrated Internet camera shown in FIG. 2.

Once control returns to the transmit routine at step S46, a write (single) file routine, appearing in FIG. 13, is executed. In the write file routine, the microcontroller 200 checks whether a connect or login error was generated at step S71. If an error was generated (i.e., if making any of the transport control protocol, telephone transmission protocol, or file transfer protocol logins or connections were abandoned), the microcontroller 200 abandons the write file routine at step S71 and returns to the transmit routine (following step S46). If no error was generated, i.e., all connections were successful, control proceeds to step S72.

In step S72, the microcontroller 200 retrieves the directory listing of the assigned filename and directory of the image file (image slot) to be written, including at least file size and date. This information is retrieved so the microcontroller 200 may compare the file last written with the file to be written/uploaded via the file transfer application (e.g., FTP). Control then proceeds to step S74. In step S74, the controller compares the retrieved file information with the information of the image file to be written, and writes the image file in the designated image slot if necessary, together with the file transfer application, acting as a directory selecting device, based on the parameters set in the IMAGE FILES: FILE DEFINITION variable group. For example, if an "overwrite" parameter is set to ON in the IMAGE FILES: FILE DEFINITION variable group, the microcontroller 200 deletes the file residing in the destination directory and writes the image file in the designated image slot to the destination directory, but does not overwrite the resident image if "overwite" is OFF. If a "more recent" parameter is set with an accompanying interval, the microcontroller 200 may compare the file dates and times, and only writes the image file in the designated image slot to the destination directory if the difference is more than the interval (for example, in the case of a plurality of cameras in different locations writing to the same filename so that an image on a web page may be cycled between different locales). At the same time, the microcontroller 200 may abort an upload if the date and time of a file resident in the destination directory is identical to (or differs by less than, e.g., 5 seconds, one minute, etc.) that of an image file to be uploaded (i.e., signifying that the file to be uploaded is identical to that currently resident in the destination directory).

When the image file is written, a thumbnail image file may be written at the same time. In this case, the microcontroller 200 checks if any image slot is designated as a thumbnail slot corresponding to the written image file. If a corresponding thumbnail image is available, the microcontroller 200 writes the thumbnail image file according to the predetermined thumbnail file name associated with the parent image file name. If, as noted above, the microcontroller 200 is instead set to dynamically create thumbnail images, depending on the image slot settings, the microcontroller dynamically scales the image sent to a thumbnail size, and writes the thumbnail image using the predetermined filename associated with the parent file image. In the third alternative, the microcontroller extracts the appropriate thumbnail from the master grid "collage" thumbnail image slot, and writes the thumbnail image using the predetermined filename associated with the parent file image.

Once the image file in the designated image slot is written, control proceeds to step S75. In step S75, depending on the information stored in the "MISC OPTION: AUTOCONFIGURE" variable group (i.e., whether or not to retrieve a setup/configuration file via the file transfer application, whether to retrieve the setup/configuration file upon any file transfer connection or only batch connections, and the directory of the setup file), the microcontroller 200 downloads (via the file transfer application) and stores a new set of "setup" parameters from the defined directory. The microcontroller 200 also disconnects (logs out) from the file transfer (e.g., FTP) connection in step S75. In this manner, the user may place a setup or configuration file in his destination directory in a predetermined format recognizable by the camera 1, and the camera may download a new or modified full or partial set of operational parameters (e.g., those shown in FIG. 5) permitting remote control of camera operation.

Subsequently, control returns from the write single file routine of FIG. 13 to the transmit routine of FIG. 9 (step S48), as previously described. If the image file may not be written for any reason, e.g., the destination directory is full or the given password does not allow sufficient access, a reportable error is generated (i.e., generated and recorded) and the failure is counted in the monitoring of the number of retries in step S58 and parent step S44.

Figure 14:
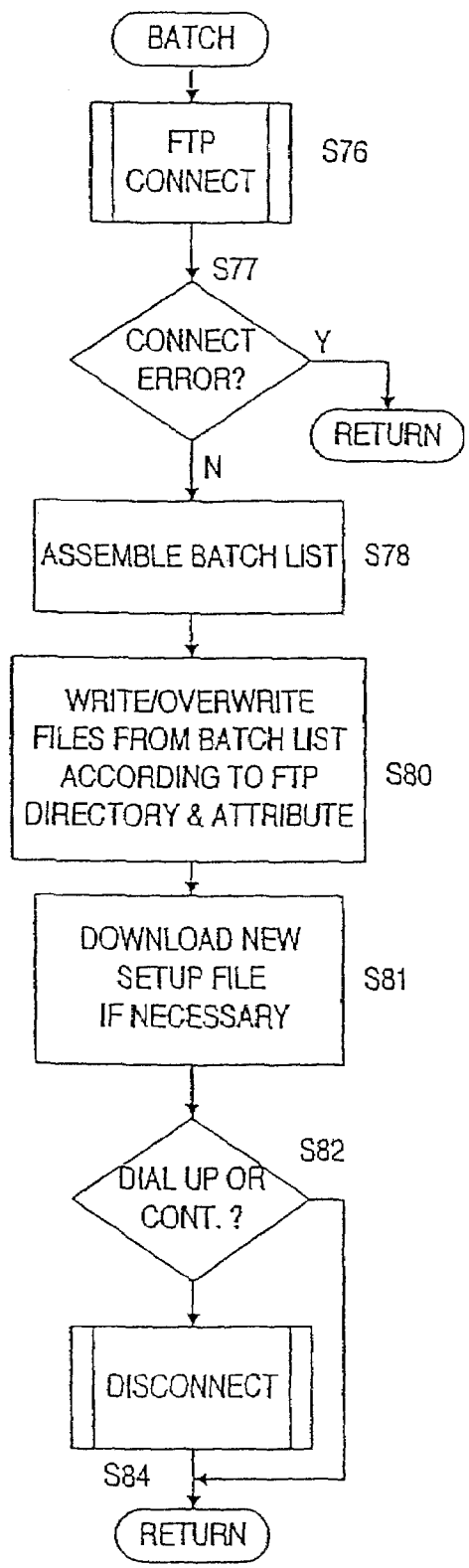
FIG. 14 is a flow chart of a batch upload routine of the integrated Internet camera shown in FIG. 2.

FIG. 14 is a flowchart describing a batch (or buffered) upload routine, which may be called from the main process at step S20 upon the expiration of the batch timer designated in the MISC OPTION: BATCH variable group. As previously described, each of the image slots has a defined parameter in the IMAGE FILES: UPLOAD variable group that designates whether the image file in the image slot is available for batch (or buffered) upload (as opposed to immediate upload). As shown in FIG. 14, in the batch upload routine, the microcontroller 200 first calls the FTP connect routine of FIG. 11, which behaves in an identical manner to that previously described (with respect to step S76). Subsequently, the microcontroller 200 checks whether any connection failure error was generated in the FTP connect routine, and aborts the batch upload routine if any connection failure (modem, transport control, or file transfer) occurred, identically to that previously described with respect to step S41. Control then passes to step S78, in which the microcontroller 200 assembles a batch list of image files in file slots to be uploaded (e.g., in the GP memory 228). The batch list contains information (i.e., an index) identifying each of the file slots that is identified as available for batch upload in the respective IMAGE FILES: UPLOAD variable groups. The microcontroller 200 then proceeds to step S80. Step S80 is performed identically to the previously described step S74 of the write single file routine of FIG. 13, except that the upload is performed for each image slot in the batch list. Accordingly, each image file corresponding to designated image slots in the batch list is written to a corresponding destination directory.

In this manner, a set of image files (e.g., image files showing daily scenes) recorded and stored at different times may be uploaded together to the directory in a single connection session (e.g., a batch upload once a week including different daily scenes). Following step S80, control proceeds through step S81 (identical to previously described step S75), step S82 (identical to previously described step S46), step S83 (identical to previously described step S47), and step S84 (identical to previously described step S50), and returns to the main process of FIG. 6 following step S20.

Figure 15:
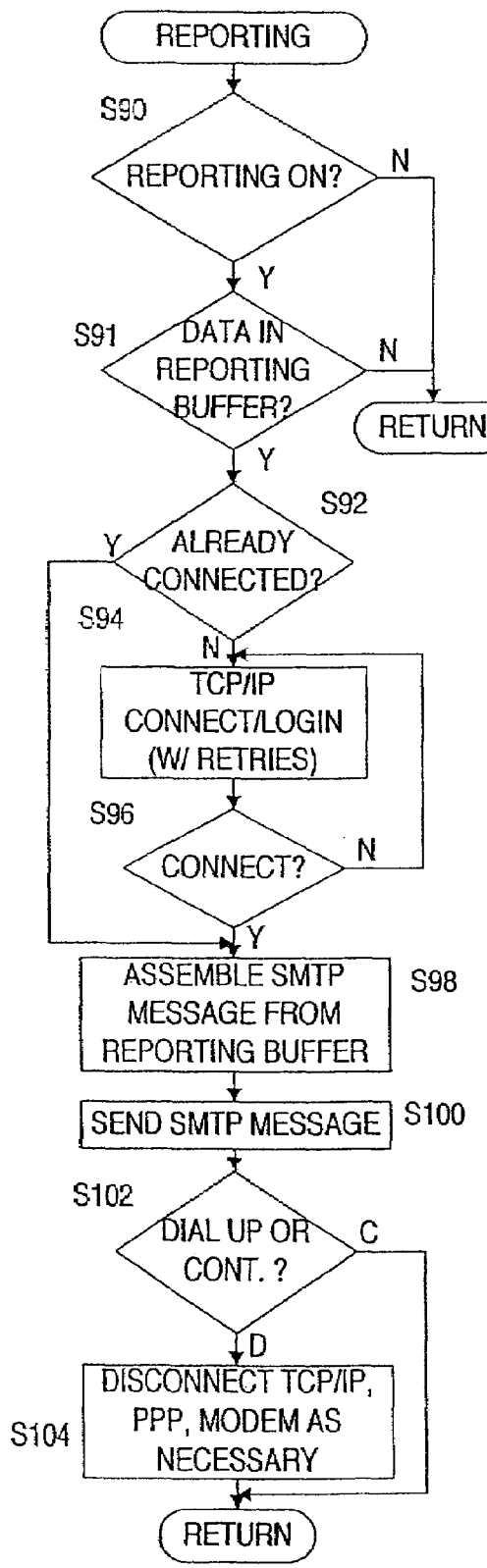
FIG. 15 is a flow chart of a reporting routine of the integrated Internet camera shown in FIG. 2.

FIG. 15 shows a reporting routine that is executed following any of steps S18, S20, or S24 of the main routine. Once the camera 1 is connected via the transport control protocol (e.g., TCP/IP) to the Internet, it may send E-mail messages using the mail protocol portion (e.g., SMTP) of the transport control (e.g., TCP/IP) protocol via an assigned mail (e.g., SMTP) server. Preferably, the mail protocol portion (e.g., SMTP) includes extensions (e.g., MIME) allowing the attachment of binary files (e.g., images, audio). In this manner, the owner or operator of the camera 1 may receive status reports from the camera, as well as or including attached image files. Depending on the parameters in the REPORTING: REPORTS variable group, when an error is generated in any of the scenarios previously described, when an upload of an image file or batch of image files is completed, or when the parameters are changed in the parameter storage structure, the microcontroller 200 appends a (brief or verbose) status message, date, and time to a reporting buffer in the GP memory 228. Further, if the REPORTING: REPORTS variable group specifies attachments and corresponding designated image slot(s), when a designated image slot is updated according to intervals, date and time, or event-based (e.g., manually), then an attachment status message is appended to the reporting buffer in the GP memory 228 (e.g., at step S20 or step S22 of FIG. 7). In the reporting routine, the microcontroller 200 uses the E-mail addressing information stored in the COMMUNICATIONS: CAMERA ADDRESS (e.g., SMTP server) and REPORTING: ADDRESS variable groups to send simple E-mail messages reporting the status of the camera 1 (i.e., sending the contents of the reporting buffer as part of an E-mail message), and/or the contents of designated image slots as attachments, to an E-mail address anywhere on the Internet.

As shown in FIG. 15, in the reporting routine, the microcontroller 200 checks whether reporting is ON according to the REPORTING: REPORTS variable group (i.e., whether any of uploads, errors, or setup updates are set to be reported) in step S90. If reporting is OFF, the microcontroller 200 aborts the reporting routine and returns to the originating routine (i.e., the main routine of FIG. 6). If reporting is ON, the microcontroller 200 proceeds to check whether any data exists in the reporting buffer at step S92. If no data exists in the reporting buffer, the microcontroller 200 aborts the reporting routine and returns to the originating routine (i.e., the main routine of FIG. 6). If data exists, control proceeds to step S92.

Steps S92, S94, and S96 are identical to steps S53, S54, and S56 as previously described, including the generation of errors and retries. Accordingly, only if the microcontroller 200 makes a successful transport control (e.g., TCP/IP) connection, control proceeds to step S98 (otherwise aborting and returning to the main process following step S25. In step S98, the microcontroller 200 assembles a mail (e.g., SMTP) message, including the contents of the reporting buffer as text, an appropriate header from the parameters stored in the REPORTING: ADDRESS variable group, any necessary dummy information to fill out unused fields in the mail protocol, and attached image file(s)having appropriate designated image slot file name(s), or pointers thereto, as designated in the REPORTING: REPORTS variable group. The microcontroller 200 then proceeds to step S100, in which the camera provides the mail (e.g., SMTP) message (and attached images as designated) to the local mail (SMTP) server (which subsequently directs the message to its ultimate destination). Control then passes through steps S102 and S104. Step S102 is identical to the previously discussed step S48, bypassing the succeeding disconnect step S104 if continuous access is set. Step S104 is identical to the previously discussed step S52, in which the microcontroller 200 disconnects the transport control protocol, telephone transmission protocol, and modem connections (as appropriate), and then returns to the originating process, i.e., to the main process following step S25 (which then returns to step S16).

Accordingly, as determined by the user, the camera 1 reports the status of image uploads, errors, and changes in operational parameters, as well as sending attached image files, via E-mail sent over the Internet, thereby taking advantage of the transport control protocol (TCP/IP) connection, provided primarily for image upload, to advise the camera's operator of problems with the camera 1 or directly provide the operator with an image file via E-mail. Even the cessation of E-mail reports from the camera 1 can notify the camera's operator that the camera 1 is no longer able to access the Internet.

Figure 16A:
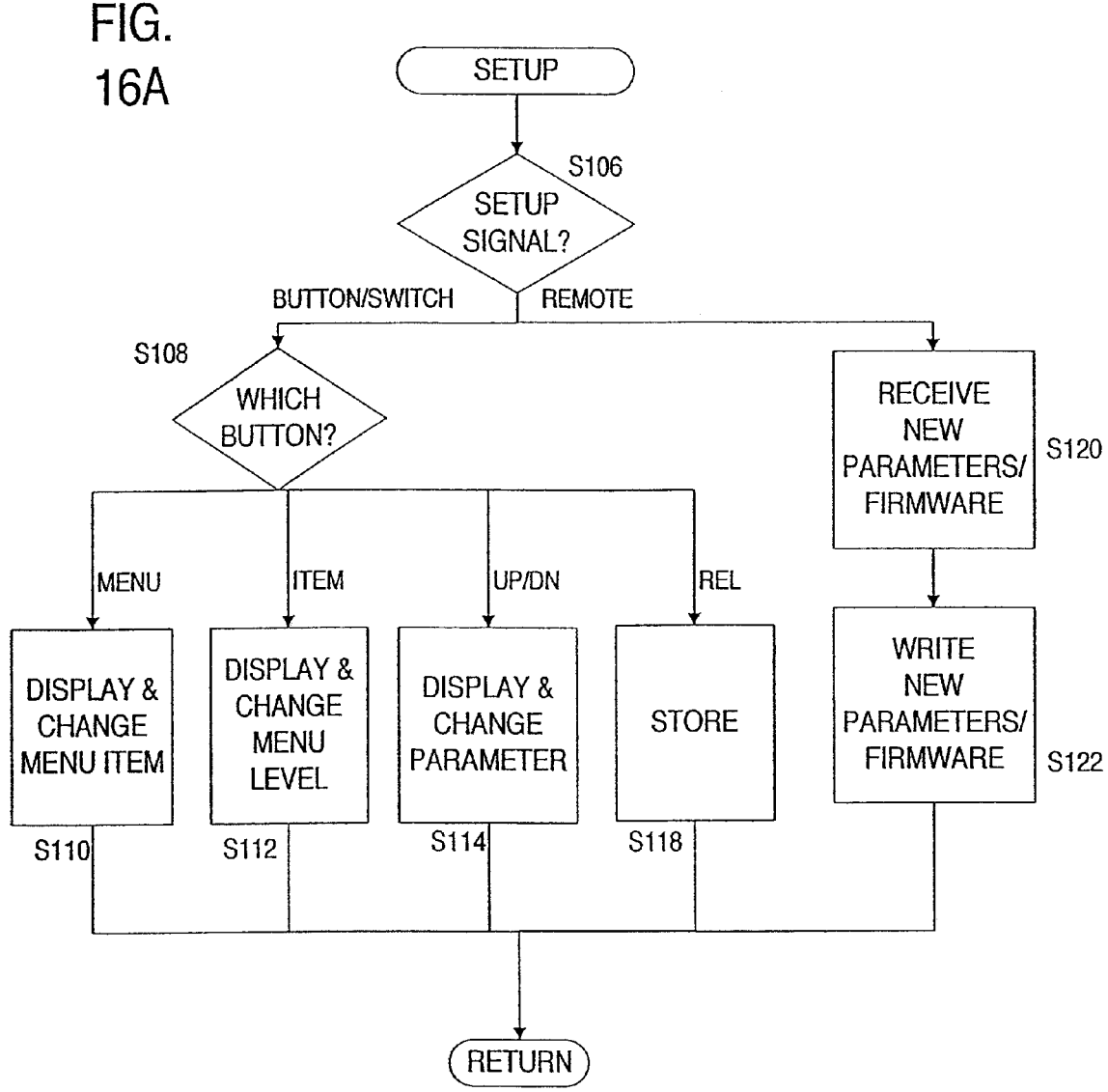
FIG. 16A is a flow chart of a setup routine of the integrated Internet camera shown in FIG. 2.
Figure 16B:
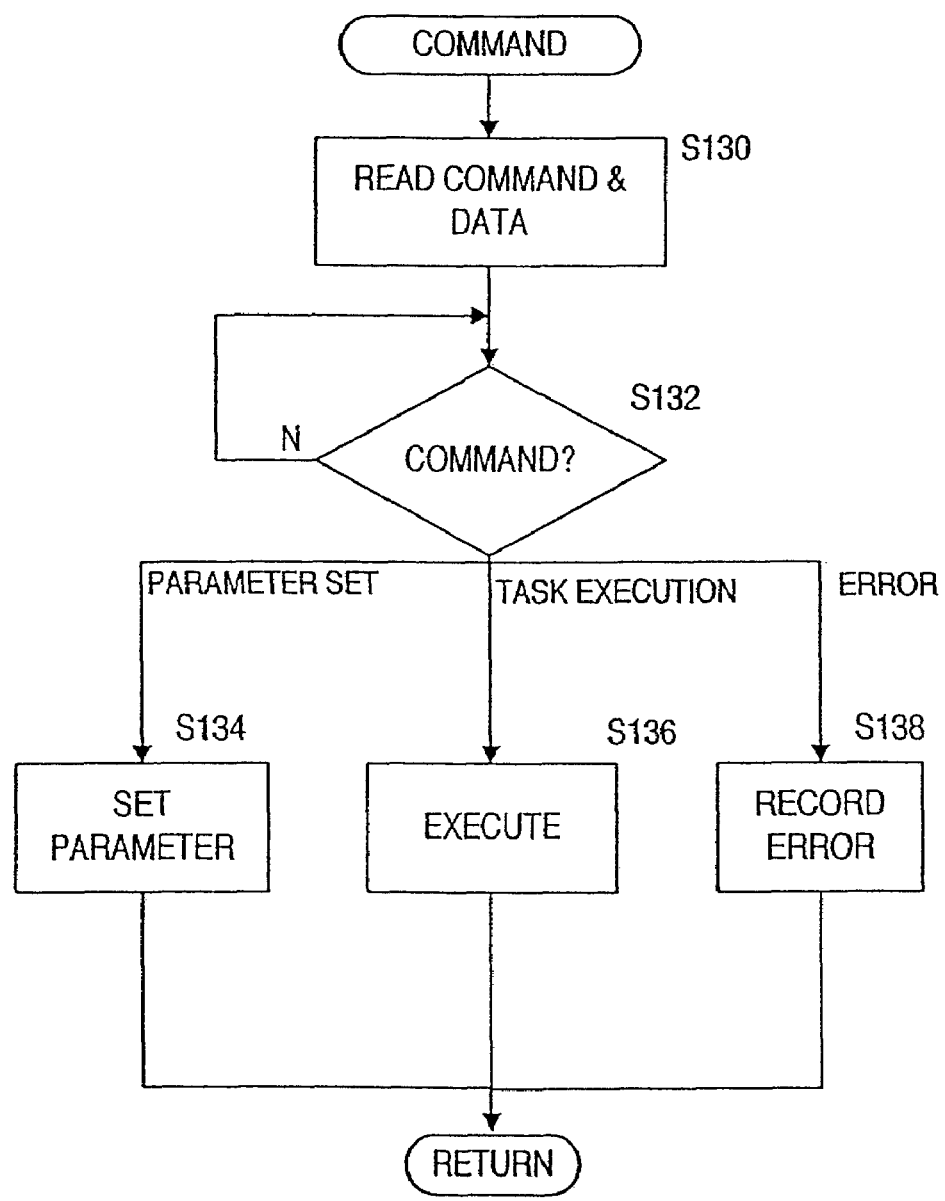
FIG. 16B is a flow chart of a command routine of the integrated Internet camera shown in FIG. 2.

FIG. 16A is a flowchart showing an example method of controlling a setup routine, entered from step S18 of the main process, upon an input of either a local or remote setup signal. The camera 1 detects whether the setup operation is internal or via an attached or connected setup device. A "setup signal" can be initiated, e.g., by depressing any of the buttons of the button/switch input 214, or can include any setup data received via the serial/IrDA port 210, e.g., from a connected PC 216. In step S106, the microcontroller 200 determines, via the keyboard controller 212, whether any button has been pressed on the button/switch input 214 (proceeding to step S108), or whether setup data is received via the serial/IrDA port 210 (proceeding to step S120).

Instep S108, the keyboard controller 212, in combination with the microcontroller 200, intercepts the button pressed and displays the variable group and parameters in the display 218 via the LCD controller 206 as a textual, tabular, or graphical representation. (i.e., initially displaying the IMAGE FILES storage area). If, e.g., the "menu" 114c button is pressed, control proceeds to step S110; if the "item" button 114d is pressed, control proceeds to step S112; if the "up" or "down" buttons 114a or 114b are pressed, control proceeds to step S114; if the "other" button is pressed, e.g., the "autoconfigure" button 214f, control proceeds to step S116; and if the release button 114e is pressed (after the setup routine has been entered), control proceeds to step S118.

In step S110, the microcontroller 200 switches focus between menu/storage items of the same "level" in the menu/storage hierarchy, i.e., between storage areas, image slots, variable groups, or parameters (as shown in FIG. 5), and displays an appropriate message via the LCD controller 206 and display 218. For example, when the "menu" button 114c is sequentially pressed when "IMAGE FILES" is displayed, the microcontroller cycles through and sequentially displays "IMAGE FILES"; "MISC OPTION"; "COMMUNICATIONS"; and "REPORTING"; and when the "menu" button 114c is sequentially pressed when "FILE 1" is displayed, the microcontroller cycles through and sequentially displays "FILE 1"; "FILE 2"; through (e.g.) "FILE 9"—menu/storage items of the same "level". Control then returns to step S108.

In step S112, the microcontroller 200 switches between "levels" of menu/storage items, i.e., between storage areas, image slots, variable groups, or parameters (as shown in FIG. 5), and displays an appropriate message via the LCD controller 206 and display 218. For example, when the "item" button 114d is sequentially pressed when "IMAGE FILES" is displayed, the microcontroller cycles through and appends to the display "IMAGE FILES"; "FILE1"; "FILE DEFINITION" and "FILE NAME"—"levels" of menu/storage items. Control then returns to step S108.

In step S114, the microcontroller 200 switches between possible values of parameters (the direction of cycling according to which of the "up" or "down" buttons 114a, 114b is pressed) and changes the displayed parameter via the LCD controller 206 and display 218. For example, when one of the "up" or "down" buttons 114a, 114b is pressed when "IMAGE FILES: FILE 1: UPLOAD: IMMEDIATE/BATCH" is displayed, the microcontroller 200 cycles through and highlights "immediate" or "batch"—all the possible values for that particular parameter. When the parameter is a numeric or an alphanumeric field such as a telephone number, file name, directory, or message, the microcontroller 200 cycles through and displays numerals or ASCII characters (as appropriate) upon depressions of the "up" or "down" buttons 114a, 114b (the direction of cycling according to which of the "up" or "down" buttons 114a, 114b is pressed). In this case, the microcontroller 200 may move focus to the next character place in the numeric or alphanumeric field upon a press of one of the "up" or "down" buttons 114a, 114b simultaneously with a press of the "item" button 114c (the direction of moving according to which of the "up" or "down" buttons 114a, 114b is pressed in combination with the "item" button 114c). Control then returns to step S108.

In step S118, when the release button 114e is pressed while the microcontroller 200 executes the setup routine, the microcontroller 200 stores all the parameter and value changes made, and returns to the main process of FIG. 7 following step S18.

In step S120, the microcontroller 200 receives and writes from the remote source (e.g., via the serial/IrDA port 210 from a PC 216 or setup device linked to the camera 1) a new set of parameters to be written to the structure of FIG. 5, or new firmware code to be written to the NVRAM 242 (e.g., EEPROM or flash memory). As described, setup may be initiated via the serial/IrDA port 210, and the PC 216 runs dedicated or general-purpose software that may receive data, command results, and images from the camera 1, and transmits control data, commands and images to the camera 1; or that may write or overwrite the firmware in the NVRAM 242 (e.g., O/S, TCP/IP or other protocol stack, FTP or other file transfer application, card drivers, and other drivers and applications). Control then proceeds to step S122, in which the microcontroller 200 rewrites any portion or all of the parameter set, or rewrites any portion or all of the firmware, and then returns to the main process of FIG. 7 following step S18.

Accordingly, a user may view and/or change any of the variables or parameters in the menu/storage structure, or even update the entire firmware set or parts thereof, changing the manner in which the camera 1 is controlled. Furthermore, the user may change the parameters through direct manipulation of the button/switch 214, or by receiving setup data via the serial/IrDA port 210.

FIG. 16B is a flowchart showing an example method of controlling the setup routine, entered from step S19 of the main process, upon an input of either a local or remote command signal. This routine handles commands and functions not otherwise provided for in the preceding description, for setting parameters and executing functions. The camera 1 detects whether the command is a parameter setting command, or a task execution command. Commands having an incorrect syntax are recorded in step S138. A "command" can be, e.g., initiated by depressing one or more of the buttons of the button/switch input 214 alone or in combination, generated internally by timer, event, or process, or can include any command received via the serial/IrDA port 210, e.g., from a connected PC 216. In step S130, the microcontroller 200 receives data initially identified as a command, e.g., having the appropriate escape code, and identifies the originator of the command (e.g., external setup device via the serial/IrDA port 210, or an internal request). The microcontroller 200 then identifies what type of command has been received, e.g., a parameter setting command (proceeding to step S134), a task execution command (proceeding to step S136), or a command having an incorrect syntax (proceeding to step S138).

Parameter setting commands and Task Execution commands may include, but are not limited to, the following examples.

System Setup and Image Parameter setting commands may include: Set Serial Number; Set Time; Set Hardware Settings; Set Modem Parameters; Set Timeouts; Set Schedule; Set Debug Options; Set Serial Number; Set Image Appearance Parameters; Set Image Spatial Parameters; Set Image Time stamp Parameters.

Connection Parameter setting commands may include Set DNS; Set Image File Name, Set FTP Host; Set FTP username/password; Set SMTP host; Set SMTP username/password; Set Email destination; Set Primary Dialup String; Set Primary Dialup Return/Response String; Set Secondary Dialup String; Set Secondary Dialup Return/Response String; Set Login String Definition; Set Login String; Set Login Return/Response String; Set PPP options; Set PPP Username; Set PPP Password; Set Email/LAN options.

Any Parameter setting command may also be used for retrieving the parameter to be set. For example, upon receiving a "Get" parameter setting command, the camera may report status information. Some examples of "Get" Parameter setting commands may include: Get Serial Number; Get Time, Get Camera Status; Get Camera Version.

In the case of the Parameter Setting Commands, in step S134, the microcontroller 200 writes the specified parameter in the structure shown in FIG. 5, or reads the specified parameter therefrom and reports it to the command originator.

Task Execution commands result in execution of the specified Task as soon as possible (in most cases, immediately). For example, some Task Execution commands may include: Send JPEG image viaport (210), Reset; Clear Memory; Send Output Trigger Signal; Record JPEG image; Reset Timer; Send Email report; Firmware Update.

In the case of Task Execution commands, in step S136, the camera executes the task specified, using, e.g., the routines detailed in the described embodiments herein, or when the manner of task execution is straightforward or a single function, directly.

In the case of a command syntax error, the error is reported to the command originator and written in the reporting buffer in the manner described herein with respect to other errors.

In general, any function initiated via the buttons, triggers, timers, or events as described herein, may also be directly initiated via an appropriate command received via the port 210. The camera 1 is responsive to the commands received from dedicated or general-purpose software on an attached PC 216 that may receive data, command results, and images from the camera 1, and that transmits control data, commands and images to the camera 1; or that may write or overwrite the firmware in the NVRAM 242 (e.g., O/S, TCP/IP or other protocol stack, FTP or other file transfer application, card drivers, and other drivers and applications).

Accordingly, using the command routines, a user may initiate any operation of the camera 1 via, e.g., internal commands, or external commands sent over the serial/IrDA port 210.

Figure 17:
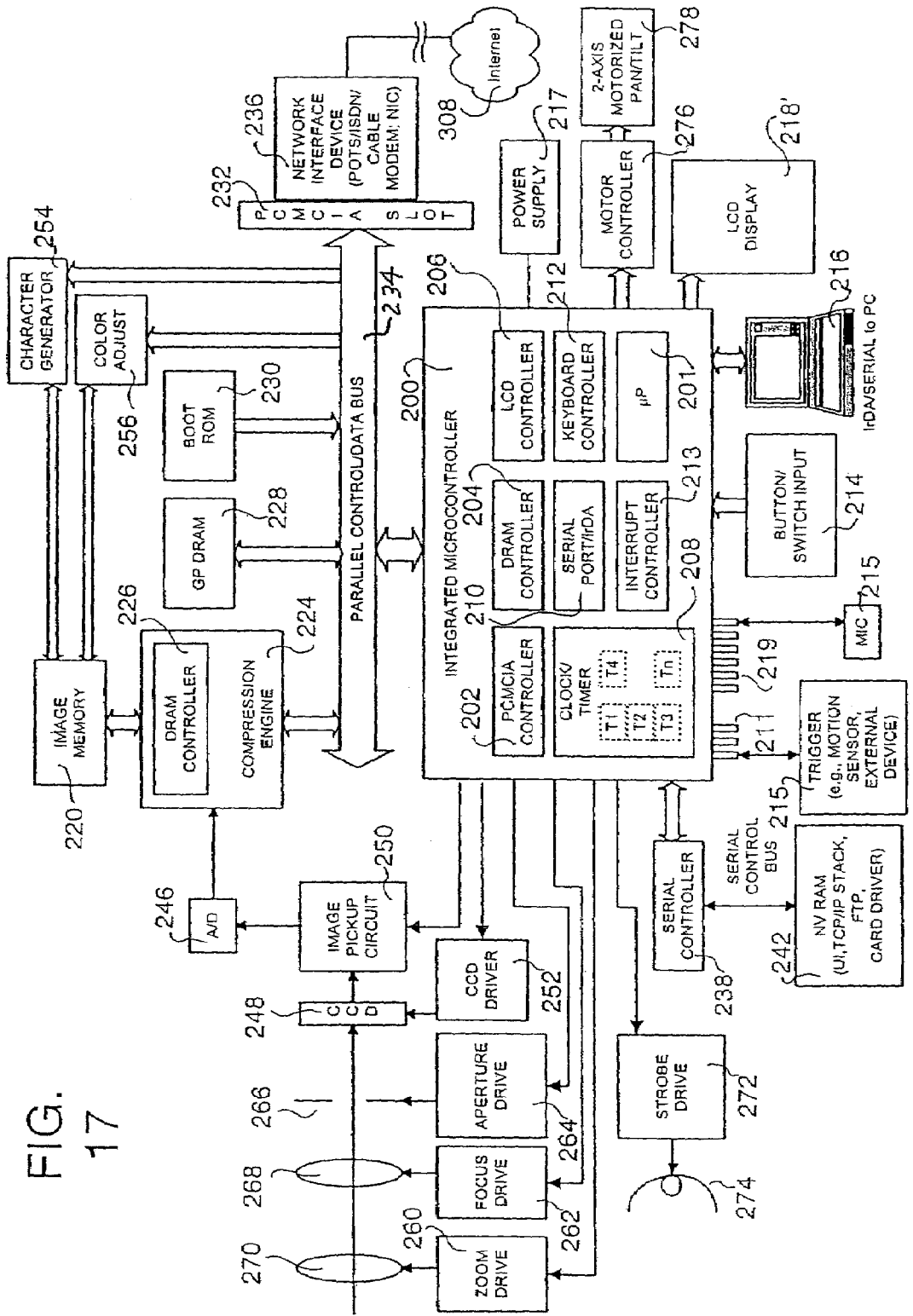
FIG. 17 is a block diagram of a second embodiment of an integrated Internet camera according to the invention.

FIG. 17 shows a block diagram of a camera 1 according to a second embodiment of the present invention. As shown in FIG. 17, the camera 1 of the second embodiment of the invention utilizes the same fundamental operating core as the first embodiment, incorporating the features described with reference to FIGS. 2-16. Accordingly, a description of elements already described with reference to the first embodiment and to FIGS. 2-16 (i.e., those having the same reference numerals and/or supporting the same or similar functions) is omitted.

The second embodiment of the present invention adds additional, more sophisticated features to the first embodiment. As shown in FIG. 17, the second embodiment is provided with a zoom lens system and autofocus system. A zooming lens 270 is driven between different focal lengths by a zoom drive 260 incorporating a motor. A focusing lens 268 is driven to focus an image on the image pickup 248 by a focus drive 262 incorporating a motor. An aperture 266 is driven to restrict the amount of light impinging on the image pickup 248 by an aperture drive 264 incorporating a motor. A strobe 274 is driven by a strobe drive 272.

The zoom drive 260, focus drive 262, aperture drive 264, and strobe 274 are connected to and driven by the microcontroller 200, i.e., via one or more GPIO pins as previously described. The strobe 274 and aperture 264 are controlled (in step S32 of FIG. 8 along with the exposure) by the microcontroller 200, according to the exposure information taken during step S32 of the capture routine of FIG. 8 (as previously described), to ensure that the exposure of each image is proper. The focus drive 264 is controlled (in step S32 of FIG. 8 along with the exposure) via an autofocus value calculated by the microcontroller 248 according to the conventional method of contrast information, using the images taken during step S32 of the capture routine. The button/switch input 214 incorporates additional buttons to those described with respect to FIG. 2 in order to zoom in, zoom out, and control the strobe 274.

Instead of the viewfinder 244, the camera 1' of the second embodiment utilizes a detachable or integrated full video (LCD) display 218'. Accordingly, the display 218' is a color or greyscale (video) LCD, and the LCD controller 206 drives the display 218' to show images formed on the image pickup 248. In this manner, although the display 218' may be more expensive than the aforementioned multiline display 218, the display 218 shows a more accurate representation of the scene at which the camera 1 is directed than the viewfinder, and a more accurate preview of the image that will be captured.

In addition, the microcontroller 200 is linked to a motor controller 276 (e.g., via one or more GPIO pins), which controls a 2-axis motorized pan/tilt mount 278 to which the camera 1' of the second embodiment is mounted. Accordingly, the camera 1 may control the pan/tilt mount 278 to point itself in any direction.

Figure 19:
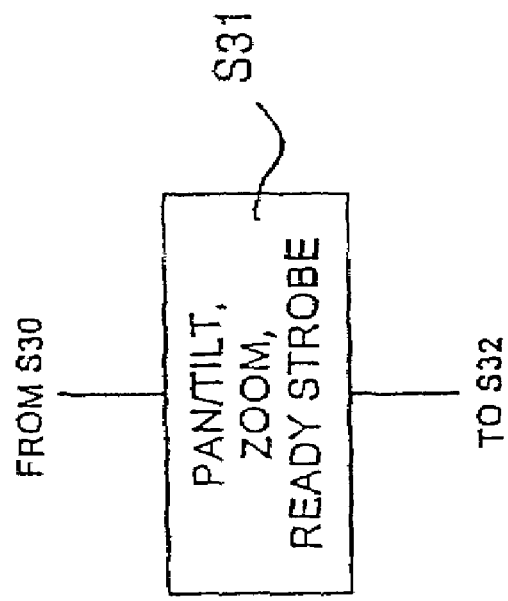
FIG. 19 is a flowchart addendum to image capture routine of FIG. 8 for the second embodiment shown in FIG. 17.
Figure 18:
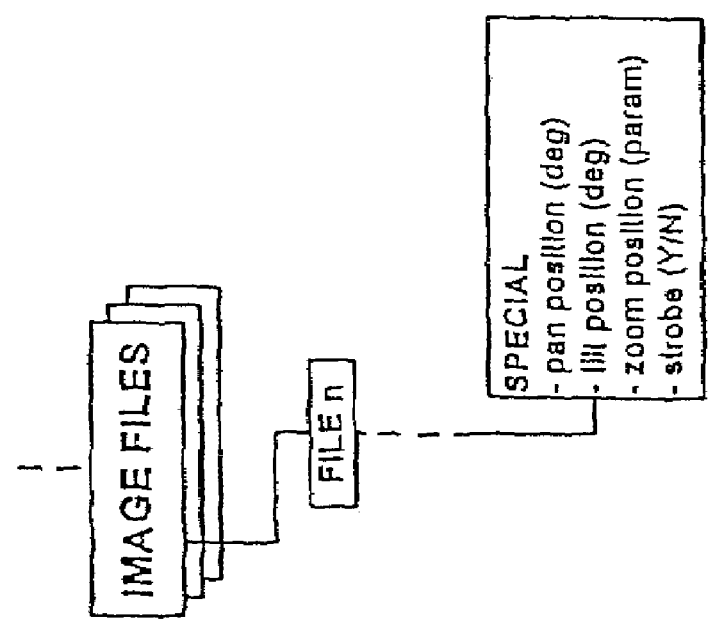
FIG. 18 is a block diagram of an addendum to the menu and parameter storage structure of FIG. 2 for the second embodiment of FIG. 17.

In the second embodiment, in order that a pan/tilt setting, zoom setting, and strobe setting may be separately implemented for each image slot, each IMAGE FILES menu storage area, shown in FIG. 5, further incorporates a SPECIAL variable group, as shown in FIG. 18, in which a pan position parameter, a tilt position parameter, a zooming position parameter, and a strobe toggle may be set. In this case, as shown in FIG. 19, a step S31 (preceding step S32 of FIG. 8) is executed, in which the microcontroller 200 controls the zoom drive 260 and 2-axis pan/tilt mount 278 to direct the camera 1 in the direction specified in the pan and tilt parameters, to zoom to an appropriate amount as specified in the zooming position parameter, and to activate the strobe 274 according to the strobe (Y/N) toggle and exposure information. It should be noted that the parameters in the SPECIAL variable group may be changed locally via the button/switch input 214 or serial/IrDA port 210, or remotely via the auto-configure process or setup file retrieval method as previously described. Accordingly, zooming, panning, and tilting may be locally changed and remotely controlled, as can any of the remaining parameters.

Figure 20:
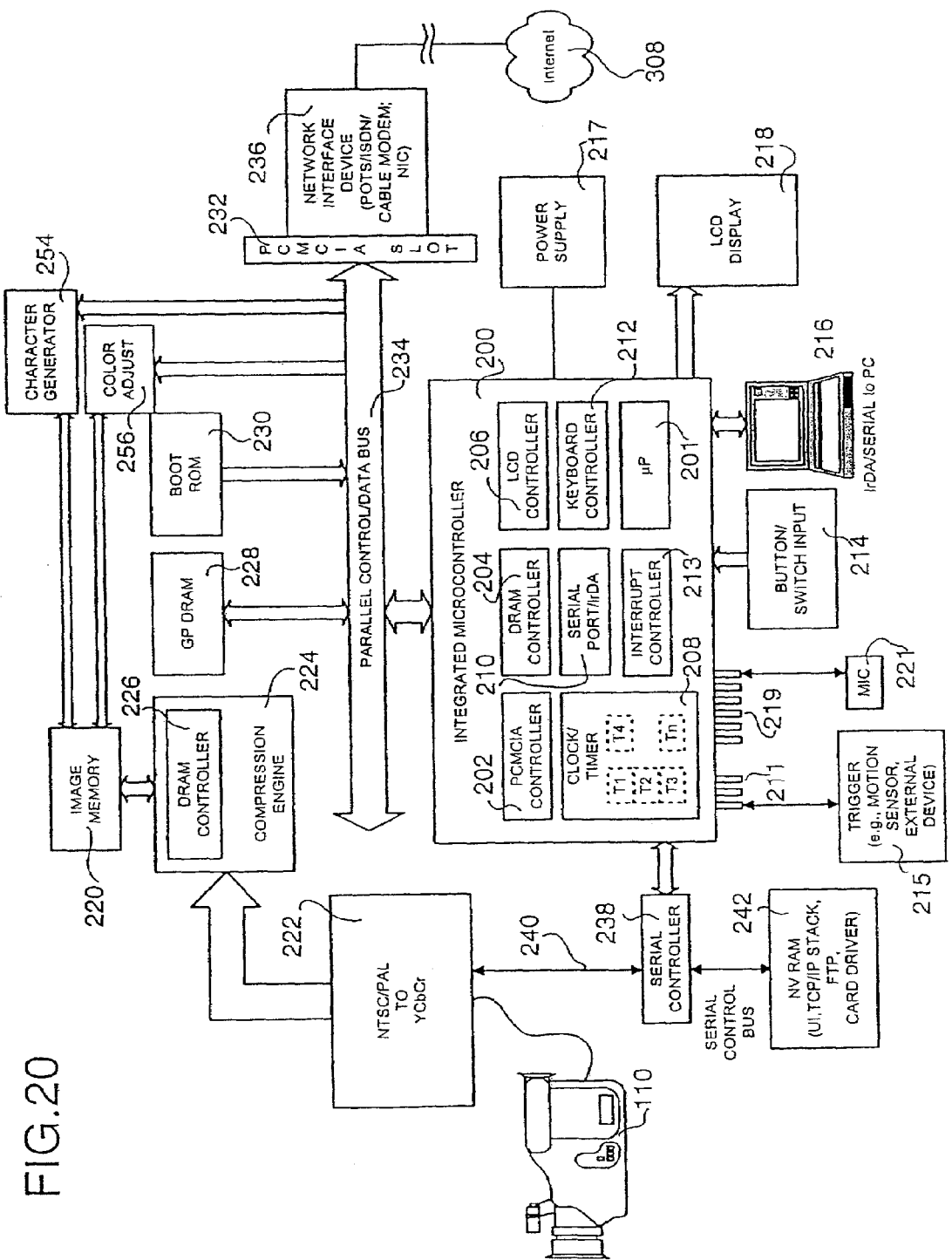
FIG. 20 is a block diagram of a third embodiment of an integrated Internet camera according to the invention

FIG. 20 shows a block diagram of an Internet camera according to a third embodiment of the present invention. As shown in FIG. 20, the third embodiment of the invention utilizes the same fundamental operating core as the first embodiment. Accordingly, a description of elements already described with reference to the first embodiment and to FIGS. 2-16 (i.e., those having the same reference numerals and/or supporting the same or similar functions) is omitted.

As shown in FIG. 20, in the third embodiment of the invention, the viewfinder 244, image-forming optical system 245, image pickup 248, image pickup driver 252, and image pickup circuit 250 of the first embodiment are omitted from the third embodiment, although all of the remaining components are housed together as in FIG. 2. In place of the omitted components, the third embodiment of the invention includes an image converter 222 that converts an NTSC or PAL signal to a luminance (Y) signal and two color difference signals (Cb—blue, Cr—red). The image converter 222 is connected to the microcontroller 200 and controlled by the microcontroller 200 via the serial controller 238 and serial control bus. One example of a suitable image convertor 222 is a Brooktree Bt829, available from Rockwell Semiconductor Systems, Inc., 4311 Jamboree Road, Newport Beach, Calif., 92658.

The image converter 222 is connected to a conventional camcorder or CCTV 110 that supplies an NTSC or PAL signal of the scene at which the camcorder 110 is directed. It should be noted that the connection is not necessarily to a camcorder or CCTV, but may be to any NTSC or PAL source, e.g., a VTR, television tuner, etc. Accordingly, the third embodiment of the invention avoids the use of a complicated setup requiring a stand-alone personal computer.

Otherwise, the third embodiment of the invention operates substantially identically to the manner in which the first embodiment operates, including the description relating to FIGS. 4-16.

Figure 21:
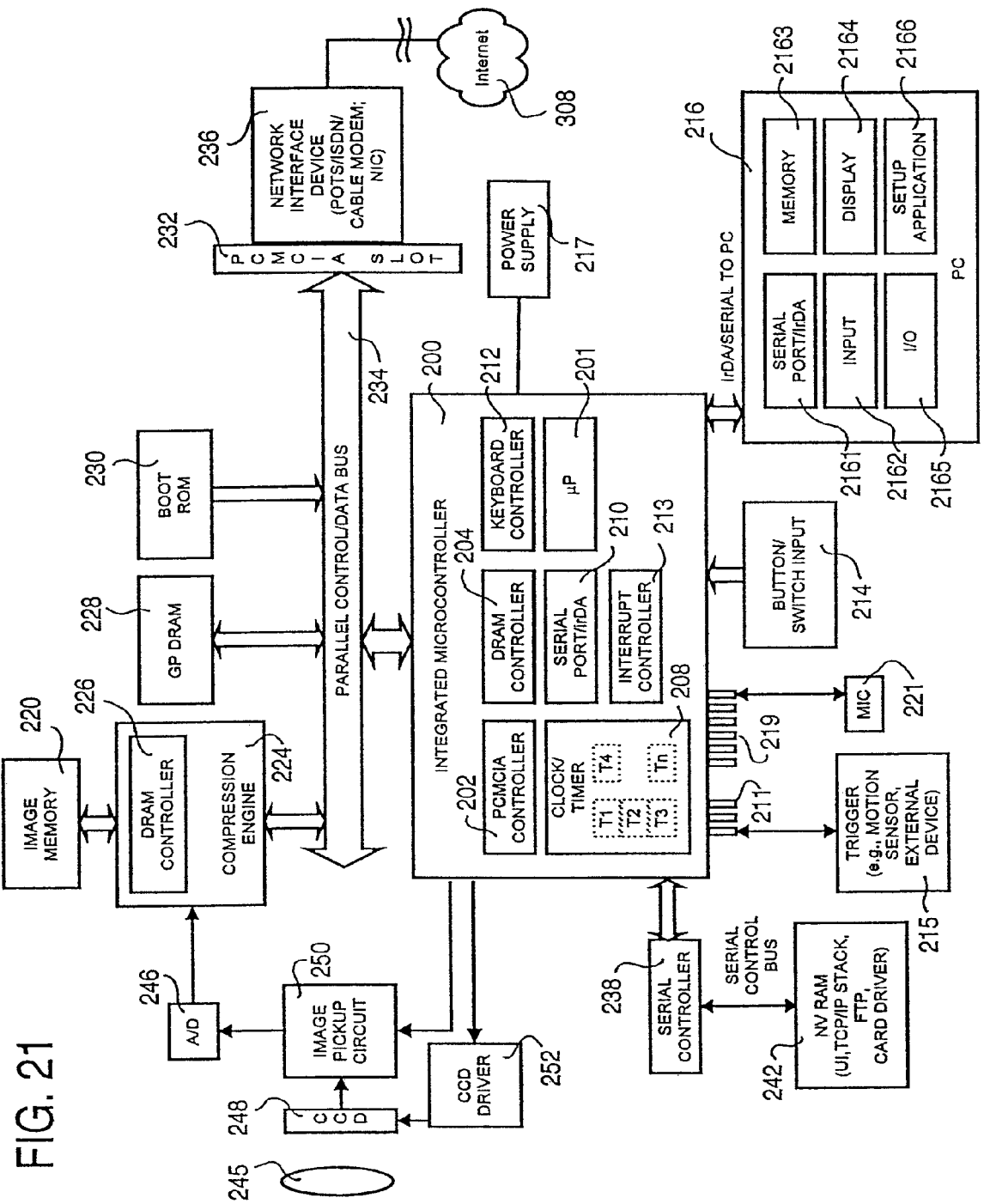
FIG. 21 is a block diagram of a fourth embodiment of an integrated Internet camera according to the invention.

FIG. 21 shows a block diagram of an Internet camera according to a fourth embodiment of the present invention. As shown in FIG. 21, the fourth embodiment of the invention utilizes the same fundamental operating core as the first embodiment. Accordingly, a description of elements already described with reference to the first embodiment and to FIGS. 2-16 (i.e., those having the same reference numerals and/or supporting the same or similar functions) is omitted.

As shown in FIG. 21, in the fourth embodiment of the invention, the viewfinder 244, image-forming optical system 245, image pickup 248, image pickup driver 252, image pickup circuit 250, character generator 254, color adjust circuit 256, display 218, display controller 206 of the first embodiment are omitted from the fourth embodiment, although all of the remaining components are housed together as in FIG. 2. The fourth embodiment, by omitting parts that are only used in setup, and allowing initial setup via the PC, allows the integrated Internet camera to be produced more inexpensively.

The fourth embodiment of the invention uses a (e.g., laptop) personal computer PC 216 for initial setup, but thereafter may be controlled as previously described with respect to FIGS. 4-16. For example, the PC 216 may incorporate a serial port/IrDA port 2161 for communicating with the camera, an input 2162 (e.g., keyboard and/or mouse) for inputting commands via the PC 216 to the camera, a display 2164 for displaying the images retrieved by the CCD 248 (output to the PC 216 via the serial port/IrDA port 210 of the camera) so that the camera may be properly aimed and positioned, a memory 2163 for storing data (including image data), and I/O system for communicating between the operating system or applications and the serial port/IrDA port 2161, and a setup application that reads from and writes to the previously described parameter storage structure (e.g., of FIG. 5) via the serial/IrDA port 210. it should be noted that the described PC 216, including the elements 2161-2166, may be used with any of the first through third embodiments.

Otherwise, the fourth embodiment of the invention operates substantially identically to the manner in which the first embodiment operates, including the description relating to FIGS. 4-16, excepting those features requiring components omitted in the fourth embodiment (e.g., color adjustment, character generation, etc.).

Figure 22:
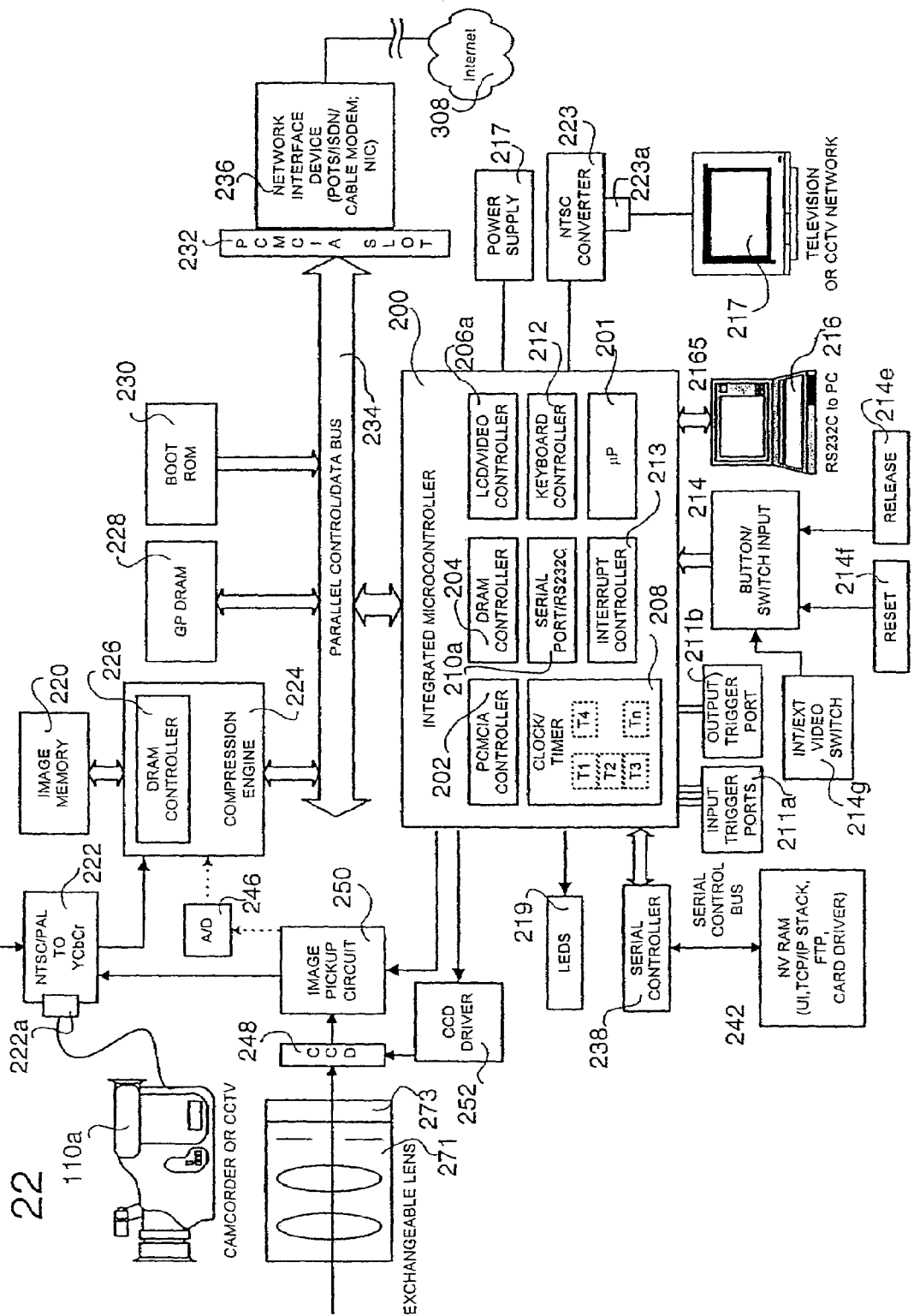
FIG. 22 is a block diagram of a fifth embodiment of an integrated Internet camera according to the invention.

FIG. 22 shows a block diagram of an Internet camera according to a fifth embodiment of the present invention. As shown in FIG. 22, the fifth embodiment of the invention utilizes the same fundamental operating core as the first embodiment. Accordingly, a description of elements already described with reference to the first embodiment and to FIGS. 2-16 (i.e., those having the same reference numerals and/or supporting the same or similar functions) is omitted.

As shown in FIG. 22, in the fifth embodiment of the invention, the viewfinder 244, character generator 254, color adjust circuit 256, and display 218 of the first embodiment are omitted from the fifth embodiment, although all of the remaining components are housed together as in FIG. 2. Further, the fifth embodiment includes exchangeable lenses as well as additional features enabling industrial use, or use as part of an CCTV network, as described below. The fifth embodiment allows the integrated Internet camera to be smoothly integrated into an unattended and/or CCTV environment.

The fifth embodiment includes trouble-shooting LEDs 219 controlled by the integrated microcontroller 200, which are used to indicate camera status, including power ON, errors, modem status, data transmission status.

Any of several interchangeable lenses 271 may be connected to the camera via a CS (standard CCTV) or bayonet mount 273. Accordingly, the camera may be matched with a wide-angle (e.g., for interior surveillance) or telephoto lens (for long-distance or outdoor surveillance).

The fifth embodiment also incorporates a NTSC/PAL to YCbCr converter 222, similarly controlled to the fourth embodiment. FIG. 22 also shows a connector 222a, preferably a BNC connector, for connecting an external video input source to the camera 1 (although RCA connectors may also be used to connect a YCrCb external video input source to the compression engine 224, in which case the YCbCr conversion is unnecessary). It should be noted that the connection at connector 222a is not necessarily to a camcorder or CCTV, but may be to any NTSC or PAL source, e.g., a VTR, television tuner, etc.

However, in the fifth embodiment, the camera 1 also includes a built-in imaging apparatus (e.g., CCD 248 and associated parts), as described with respect to the first embodiment. Accordingly, the user may select which of a camcorder/CCTV input, or internal video input, is to be used as the image source. As shown in FIG. 22, in the fifth embodiment, the image pickup circuit 250 is preferably connected directly to the NTSC/PAL to YCbCr converter 222. In this case, unlike the previous embodiments, the image pickup circuit preferably creates an NTSC or PAL signal directly from the CCD 248 output. The NTSC or PAL signal is converted by the convertor 250. Alternatively, as shown by dashed lines in FIG. 22, the image pickup circuit 250 (without NTSC or PAL conversion) may be connected via an A/D convertor 246 to the compression engine 224, similarly to the first embodiment.

An Internal/External video switch 214g is provided to the button/switch input 214. The switch 214g is monitored by the integrated microcontroller 200, and the appropriate video source may selected according to the status of the switch 214g, or determined by settings in, e.g., the MISC OPTION: HARDWARE SETTINGS variable group. When the video input 222a is connected at a video output of a CCTV monitor station cycling through various cameras at fixed intervals, the fifth embodiment of an integrated Internet camera may be scheduled to follow the cycling, and may send images from a variety of daughter CCTV cameras on the CCTV network via the network interface device 236.

Also provided to the button/switch input 214 are the release switch 214e, which initiates an immediate image capture and/or upload as previously described, as well as a reset button 214f, which initiates a soft reset operation as previously described, and/or a hard reset or reboot.

The fifth embodiment further includes an NTSC/PAL converter 223 and output 223a (having a BNC or other coaxial connector). Video or images from the camcorder/CCTV 110 or CCD 248 (optionally via the image memory 220) is routed to the output 223a. When a television or CCTV network 217 is connected to the output 223a, the same images as those sent via the network interface device 235 may be monitored locally or at a CCTV network monitor station. The NTSC/PAL converter 223 may be separately provided, or incorporated in an LCD/VIDEO controller 206a substantially similar to the LCD controller 206 previously described, but with NTSC/PAL output capabilities. It should also be noted that the input connector 222a is optionally routed directly to output connector 223a, in which case no conversion is necessary.

The fifth embodiment also incorporates at least two input trigger ports 211a and one output trigger port 211b, which are controlled similarly to the trigger inputs 211 and/or GPIO pins 219 previously described, and may be connected to triggering devices (e.g., motion sensors) and to triggerable devices (e.g., lighting, alarm). Local lighting or alarms may be controlled via the data exchange mechanisms previously described, e.g., triggering of a sensor, monitored via a trigger port 211a, initiates a call-out and interval pickup of new settings, which can set off lighting or an alarm via the output trigger port 211b, control being carried out in a manner similar to that previously described. The trigger inputs and outputs may also be managed independently—e.g., local lighting can be linked to interval-scheduled image captures, and activated to accompany the image captures. Input and output triggering conditions, status, and linked events are stored in the REPORTING menu/storage area in a TRIGGERS variable group (not shown). Triggering or triggered events may be reported along with the other information appended to the reporting buffer as previously described.

The fifth embodiment of the invention uses a (e.g., laptop) personal computer PC 216 for initial setup, but thereafter may be controlled as previously described with respect to FIGS. 4-16. For example, the PC 216a is similarly equipped to the fourth embodiment, but also incorporates a standard RS232C serial interface 2165 (a USB interface or IEEE 1394 interface may be used for the same purpose, as well as for image transfer). The serial interface 2165 communicates with the camera in the manner described in the fourth embodiment. It should be noted that the described PC 216a, including the elements described in the fifth embodiment and the RS232C serial interface 2165, may be used with any of the first through fifth embodiments.

Otherwise, the fifth embodiment of the invention operates substantially identically to the manner in which the first and fourth embodiments operate, including the description relating to FIGS. 4-21, excepting those features requiring components omitted in the fifth embodiment (e.g., color adjustment, character generation, etc.). However, it should be noted that the features of the first through fourth embodiments may be combined with those of the fifth embodiment.

Although the present specification describes components and functions implemented in the embodiments with reference to particular standards and protocols, the invention is not limited to such standards and protocols. Each of the standards for e.g., Internet transmission (e.g., TCP/IP, UDP/IP, HTML, PPP, FTP, SMTP, MIME); peripheral control (IrDA; RS232C; USB; ISA; ExCA; PCMCIA), public telephone networks (ISDN, ATM, xDSL); and video and compression (NTSC, PAL, JPEG, TIFF, GIF) represent examples of the state of the art. Such standards are periodically superseded by faster or more efficient equivalents having essentially the same functions. Accordingly, replacement standards and protocols having the same functions are considered equivalents.

Accordingly, since the integrated Internet camera according to the invention itself incorporates all the necessary components to capture digital images, make a connection to the Internet, and place the images anywhere on the Internet, the camera 1 may be easily and inexpensively used in entertainment, advertising, education, security, traffic monitoring, weather monitoring, child care monitoring, surveillance, and general consumer applications.

Although the above description sets forth particular embodiments of the present invention, modifications of the invention will be readily apparent to those skilled in the art, and it is intended that the scope of the invention be determined solely by the appended claims.

What is claimed is:

1. A standalone image recording device, comprising:
    a preview device that previews scenes to be recorded as digital image data;
    an image conversion circuit that converts an analog image signal into the digital image data;
    image storage in which the digital image data is recorded;
    a parameter memory that stores destination e-mail addressing information provided by an operator and that stores password information;

an interface controller connected to a network interface having access to an intermediary network; and a processor, which executes control routines, including:

a network access routine capable of providing access to an internet-protocol network via the intermediary network, in a first mode in which the network access routine submits the password information to access the internet-protocol network via the intermediary network, and in a second mode in which the network access routine does not submit the password information to access the internet-protocol network via the intermediary network, and an e-mail message assembling routine that assembles information for the preparation of an e-mail message to be transmitted to an internet-protocol e-mail server on the internet-protocol network and then to a destination e-mail address, the information including the destination e-mail addressing information and the digital image data.

2. The standalone image recording device according to claim 1, wherein the standalone image recording device stores a unique camera identifier to allow access to the internet-protocol network.

3. The standalone image recording device according to claim 2, wherein the unique camera identifier includes a serial number of the standalone image recording device.

4. The standalone image recording device according to claim 1, wherein the preview device is selected from one of a display or a viewfinder.

5. The standalone image recording device according to claim 1, further comprising:

an image-forming optical system;

an image pickup upon which an image is formed by the image-forming optical system; and an image capture circuit that records the digital image data in the image storage according to the image formed upon the image pickup.

6. The standalone image recording device according to claim 1, the control routines executable by the processor further including:

a parameter setting routine which designates which of a plurality of digital image data files are to be sent from the standalone image recording device together, wherein the e-mail message assembling routine assembles information for the preparation of an e-mail message including message contents representing those of the plurality of digital image data files to be sent from the standalone image recording device together.

7. The standalone image recording device according to claim 6, wherein the parameter setting routine designates those of the plurality of digital image data files to be sent from the standalone image recording device by tagging those of the plurality of digital image data files to be sent from the standalone image recording device together by a value representing designation by the operator.

8. The standalone image recording device according to claim 7, wherein the value representing designation by the operator is a batch value for an upload parameter.

9. The standalone image recording device according to claim 1, the control routines executable by the processor further including:

a message transfer server access routine capable of providing privileges on a message transfer server through which SMTP-compatible e-mail messages are directed according to the destination e-mail addressing information.

10. The standalone image recording device according to claim 1, said network interface comprising:

a network interface circuit, through which the network access routine accesses the internet-protocol network, the network interface circuit including an adapter for wireless connection.

11. The standalone image recording device according to claim 1, the control routines executable by the processor further including:

a file transmission routine that transmits the digital image data to an image file account on a server on the internet-protocol network, from which the digital image data may be served to a browser accessing the internet-protocol network, wherein the file transmission routine transmits the digital image data using a first packetizing for the intermediary network and a second packetizing for the internet-protocol network.

12. The standalone image recording device according to claim 11, wherein the intermediary network comprises a telephone connection operating under a point-to-point protocol.

13. The standalone image recording device according to claim 1, further comprising:

a serial data transmitter that transmits to a local personal computer, wherein the digital image data is selectively transmitted to one or both of: the destination e-mail address using the destination e-mail addressing information, or the local personal computer using the serial data transmitter.

14. The standalone image recording device according to claim 13, wherein the serial data transmitter includes a serial interface, and the digital image data is transmitted to the local personal computer in response to a task execution command generated by said standalone image recording device.

15. The standalone image recording device according to claim 13, wherein the serial data transmitter includes a serial interface, and the digital image data is transmitted to the local personal computer in response to a task execution command generated by said local personal computer.

16. The standalone image recording device according to claim 13, wherein the serial data transmitter includes a serial interface operating as one of an RS232C, USB, or IEEE1394 interface.

* * * * *